United States Patent
Watanabe et al.

(10) Patent No.: US 10,106,639 B2
(45) Date of Patent: Oct. 23, 2018

(54) OIL-BASED INKJET INK

(71) Applicant: RISO KAGAKU CORPORATION, Tokyo (JP)

(72) Inventors: Yoshifumi Watanabe, Ibaraki (JP); Manami Shimizu, Ibaraki (JP); Kenji Yamada, Ibaraki (JP); Tomohiro Matsuzawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/633,277

(22) Filed: Jun. 26, 2017

(65) Prior Publication Data
US 2018/0079854 A1 Mar. 22, 2018

(30) Foreign Application Priority Data

Sep. 16, 2016 (JP) .................. 2016-181738
Dec. 28, 2016 (JP) .................. 2016-255307

(51) Int. Cl.
| | | |
|---|---|---|
| *C09D 11/36* | (2014.01) | |
| *C09D 11/326* | (2014.01) | |
| *C08K 9/10* | (2006.01) | |
| *C08G 18/38* | (2006.01) | |
| *C08K 5/01* | (2006.01) | |
| *C09D 11/102* | (2014.01) | |
| *C09D 11/322* | (2014.01) | |

(52) U.S. Cl.
CPC ............ *C08G 18/3831* (2013.01); *C08K 5/01* (2013.01); *C09D 11/102* (2013.01); *C09D 11/322* (2013.01); *C09D 11/36* (2013.01)

(58) Field of Classification Search
CPC ...... C08K 9/10; C09D 11/322; C09D 11/326; C09D 11/36
See application file for complete search history.

(56) References Cited

U.S. PATENT DOCUMENTS

| | | | |
|---|---|---|---|
| 8,507,585 B2 * | 8/2013 | Hosoya | C09D 11/36 523/160 |
| 9,045,583 B2 * | 6/2015 | Ishibashi | C09D 7/62 |
| 9,365,735 B2 * | 6/2016 | Hosoya | C08F 220/18 |
| 2014/0011941 A1 | 1/2014 | Anton et al. | |

FOREIGN PATENT DOCUMENTS

| | | |
|---|---|---|
| EP | 2284228 | 2/2011 |
| EP | 2578646 | 4/2013 |
| JP | 2007-314651 A | 12/2007 |
| JP | 2011-57812 A | 3/2011 |
| JP | 2011057812 A * | 3/2011 |

OTHER PUBLICATIONS

Machine-generated English translation of JP-2011057812-A. (Year: 2011).*
Extended European Search Report; European Patent Application No. 17189118.7, Dec. 4, 2017 (5 pages).

* cited by examiner

*Primary Examiner* — Vu A Nguyen
(74) *Attorney, Agent, or Firm* — Hamre, Schumann, Mueller & Larson, P.C.

(57) ABSTRACT

An oil-based inkjet ink that exhibits excellent repellency by the nozzle plate, prevents degradation of the nozzle plate, reduces image show-through, and yields high image density. The oil-based inkjet ink includes an encapsulated pigment containing a pigment and a urethane compound that coats the surface of the pigment, and a non-aqueous solvent, wherein the urethane compound has a urethane skeleton and one or more side chains and is insoluble in the non-aqueous solvent, and the side chains of the urethane compound contain one or more moieties selected from the group consisting of an aromatic ring, a heterocyclic ring, a carboxyl group, an amide linkage, a fluoroalkyl group having one or more fluorine atoms, and a nitrile group.

12 Claims, No Drawings

OIL-BASED INKJET INK

CROSS REFERENCE TO RELATED APPLICATIONS

This Application is based upon and claims the benefit of priority from prior Japanese Patent Applications No. 2016-181738 filed on Sep. 16, 2016, and prior Japanese Patent Applications No. 2016-255307 filed on Dec. 28, 2016, the entire contents of which are incorporated by reference herein.

BACKGROUND OF THE INVENTION

Field of the Invention

An embodiment of the present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with minimal noise, it has rapidly become widespread in recent years.

One example of an oil-based inkjet ink having low viscosity even at high pigment concentrations is a technology that uses an encapsulated pigment that has undergone surface treatment with a (meth)acrylic acid-based copolymer having an acid value of 30 to 60 (see JP 2007-314651 A (Patent Document 1)).

However, this type of ink exhibits high wettability of the nozzle plate surface of the head of the inkjet printing device, and tends to adhere readily to the nozzle plate surface. As a result, various problems may arise, including ink that has adhered to the nozzle plate surface dripping onto the paper and contaminating the image, and ink that has adhered to the nozzle plate surface hindering the ink discharge.

Further, inkjet printing devices that use oil-based inks are designed to undergo a regular head cleaning operation. This head cleaning operation generally includes a pressurized purge in which the inks are discharged from the nozzles, followed by wiping of the nozzle plate.

If an ink that adheres readily to the nozzle plate surface is used, then when nozzle plate wiping is performed, the pigment in the ink functions as an abrasive and may scrape away the coating film such as a fluororesin from the nozzle plate surface, thereby causing a deterioration in the ink repellency of the nozzle plate.

In response to the above problems, JP 2011-57812 A (Patent Document 2) discloses an oil-based inkjet ink which, as a result of using an encapsulated pigment that has been surface-treated with a comb-like polyurethane that is miscible in solvents and has a compound having an α-value of 5 to 60 added to the polymer as side chains, exhibits excellent repellency between the ink and the nozzle plate, enabling degradation of the nozzle plate to be suppressed.

SUMMARY OF THE INVENTION

An object of an embodiment of the present invention is to provide an oil-based inkjet ink that exhibits excellent repellency by the nozzle plate, prevents degradation of the nozzle plate, reduces image show-through, and yields high image density.

One embodiment of the present invention provides an oil-based inkjet ink comprising an encapsulated pigment containing a pigment and a urethane compound that coats the surface of the pigment, and a non-aqueous solvent, wherein the urethane compound has a urethane skeleton and one or more side chains and is insoluble in the non-aqueous solvent, and the side chains of the urethane compound contain one or more moieties selected from the group consisting of an aromatic ring, a heterocyclic ring, a carboxyl group, an amide linkage, a fluoroalkyl group having one or more fluorine atoms, and a nitrile group.

DESCRIPTION OF THE EMBODIMENTS

Embodiments of the present invention are described below, but the examples described in the following embodiments in no way limit the present invention.

In oil-based inkjet inks, when the ink is discharged onto paper, the solvent in the ink penetrates from the paper surface into the interior of the paper. At this time, if the pigment penetrates into the interior of the paper together with the solvent, then the so-called show-through phenomenon occurs, with the image penetrating through to the rear surface of the paper. When show-through occurs, the image density on the front surface of the paper also tends to decrease.

In Patent Document 2, because a comb-like polyurethane compound having solvent miscibility is used in the encapsulated pigment, the encapsulated pigment tends to penetrate into the interior of the paper together with the ink solvent, causing show-through and reducing the image density.

First Embodiment

An oil-based inkjet ink according to one embodiment of the present invention (hereafter sometimes abbreviated as simply "the ink") comprises an encapsulated pigment containing a pigment and a urethane compound that coats the surface of the pigment, and a non-aqueous solvent, wherein the urethane compound has a urethane skeleton and one or more side chains and is insoluble in the non-aqueous solvent, and the side chains of the urethane compound contain one or more moieties selected from the group consisting of an aromatic ring, a heterocyclic ring, a carboxyl group, an amide linkage, a fluoroalkyl group having one or more fluorine atoms, and a nitrile group.

The ink of this embodiment exhibits excellent repellency by the nozzle plate, prevents degradation of the nozzle plate, and can also reduce image show-through and enhance the image density.

The side chains of this urethane compound preferably have an aromatic ring and one or more moieties selected from the group consisting of a heterocyclic ring, a carboxyl group, an amide linkage, a fluoroalkyl group having one or more fluorine atoms, and a nitrile group.

This urethane compound preferably has a structure in which a unit derived from a polyvalent isocyanate and a unit derived from an alkanolamine are arranged alternately, and the side chains of the urethane compound are preferably bonded to the urethane compound via the nitrogen atom of the unit derived from the alkanolamine.

In this embodiment, because the side chains of the urethane compound have the structure described above, the ink repellency from the nozzle plate and the wiping resistance can be improved. Moreover, specifying the side chains of the urethane compound lowers the solubility of the urethane compound in the ink solvent, meaning show-through can be reduced and the image density can be increased.

When the solubility of the urethane compound in the ink solvent decreases, the pigment that is encapsulated in the urethane compound exhibits superior solvent separability on the recording medium. Accordingly, the pigment separates from the solvent at the surface of the recording medium, and therefore when the solvent penetrates into the interior of the recording medium, the pigment can be more readily retained on the surface of the recording medium. As a result, image show-through can be reduced, and the image density can be enhanced.

Further, because the urethane compound exhibits excellent adsorption to the pigment, the pigment coating efficiency can be improved. Accordingly, in the ink, the ink solvent is blocked by the coating of the urethane compound, and can be prevented from penetrating through to the pigment. As a result, the separation of the pigment and the solvent can be improved.

Furthermore, by improving the pigment coating efficiency by the urethane compound, the pigment surface can be prevented from directly contacting and abrading the nozzle plate, thereby further improving the wiping resistance.

This ink contains an encapsulated pigment, wherein the encapsulated pigment contains a pigment and the urethane compound that coats the surface of the pigment.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

From the viewpoints of the discharge stability and storage stability, the average particle size of the pigment is preferably not more than 300 nm, and is more preferably 200 nm or less.

The amount of the pigment is typically from 0.01 to 20% by mass of the total mass of the ink, and from the viewpoints of the print density and the ink viscosity, the amount of the pigment is preferably from 1 to 15% by mass.

In the encapsulated pigment, a region comprising part or all of the surface of the pigment is coated with the urethane compound.

The urethane compound is preferably insoluble in the non-aqueous solvent used in the ink.

Specifically, the solubility of the urethane compound in 100 g of the non-aqueous solvent used in the ink at 23° C. is preferably not more than 5 g, more preferably not more than 3 g, and even more preferably 1 g or less. It is even more desirable that the urethane compound is substantially insoluble at 23° C. in the non-aqueous solvent used in the ink.

The degree of solubility in the non-aqueous solvent used in the ink in those cases where two or more solvents are used in the ink indicates the solubility in a solvent mixture prepared by mixing the two or more solvents in the same ratio as the ink.

The urethane compound has a urethane skeleton and one or more side chains. These side chains preferably contain one or more moieties selected from the group consisting of an aromatic ring, a heterocyclic ring, a carboxyl group, an amide linkage, a fluoroalkyl group having one or more fluorine atoms, and a nitrile group.

Because the side chains branch off the urethane skeleton, the urethane compound has a comb-like polyurethane structure.

Examples of compounds that can be used as the urethane compound include compounds having a main chain composed of a urethane skeleton, and one or more side chains that have been bonded to the main chain by graft polymerization. A structure obtained by reacting a polyvalent isocyanate and a polyhydric alcohol can be used as the urethane skeleton.

The urethane compound may, for example, have a structure in which a unit derived from a polyvalent isocyanate and a unit derived from an alkanolamine are arranged alternately, and the side chains of the urethane compound are bonded to the urethane compound via the nitrogen atom of the unit derived from the alkanolamine.

This type of urethane compound can be obtained by reacting a polyvalent isocyanate with an alkanolamine or a derivative thereof.

A monoalkanolamine, a dialkanolamine, or a combination thereof can be used as the alkanolamine.

Examples of monoalkanolamines that can be used include monomethanolamine, monoethanolamine, mono(n-propanol)amine, monoisopropanolamine, monobutanolamine, monopentanolamine, monohexanolamine, monoheptanolamine, monooctanolamine, monononanolamine, monodecanolamine, monoundecanolamine, monododecanolamine, monotridecanolamine, monotetradecanolamine, monopentadecanolamine and monohexadecanolamine.

Examples of dialkanolamines that can be used include dimethanolamine, diethanolamine, di(n-propanol)amine, diisopropanolamine, dibutanolamine, dipentanolamine, dihexanolamine and diheptanolamine.

Further, the monoalkanolamines and dialkanolamines may also have branch chains and/or substituents.

A dialkanolamine can be used particularly favorably in the above urethane compound.

The isocyanate group of the polyvalent isocyanate and the hydroxyl group of the dialkanolamine that represents a secondary alcohol form a urethane linkage "—NH—CO—O—", and a linkage represented by "—(CH$_2$)$_m$—NR—(CH$_2$)$_n$—" and derived from the dialkanolamine is also formed. Here, m and n each represent a positive integer, and R is a side chain.

Specifically, a urethane compound having a repeating unit represented by formula (1) shown below can be used. In formula (1), R represents a side chain, and a unit "—O—(CH$_2$)$_m$—NR—(CH$_2$)$_n$—O—" derived from a dialkanolamine containing the side chain R, and a unit "—CONH—Y—NHCO—" derived from a divalent isocyanate are arranged alternately.

[Chemical formula 2]

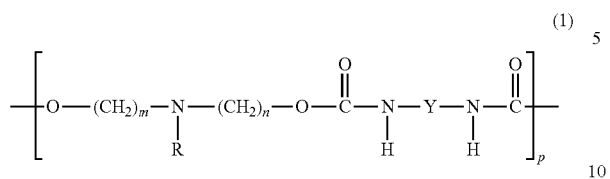

(1)

In formula (1), each of m and n independently represents a positive integer, and is preferably an integer of 1 to 18. Further, p represents a positive integer that varies depending on the polymerization degree of the urethane compound, and is typically from 5 to 100.

Y represents an arbitrary divalent group.

R represents -A-R$^1$, wherein A represents a single bond or an arbitrary divalent group, and R1 is selected from among an aromatic ring-containing group, a heterocyclic ring-containing group, a hydrogen atom, a carboxyl group, an amide linkage-containing group, a fluoroalkyl group having one or more fluorine atoms and a nitrile group, and may have a substituent.

In formula (1), R represents -A-R$^1$, and A preferably includes —(CH$_2$)$_2$—. In this case, a vinyl monomer containing the group represented by R$^1$ is reacted with the dialkanolamine "OH—(CH$_2$)$_m$—NH—(CH$_2$)$_n$—OH" by a Michael addition reaction, and the resulting dialkanolamine derivative in which the group represented by R$^1$ has been introduced at the nitrogen atom "N" of the dialkanolamine can then be used to produce the target urethane compound.

The general formula of the dialkanolamine derivative is shown below.

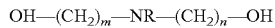

Each of m and n independently represents a positive integer, and is preferably an integer of 1 to 18. R represents a side chain.

Further, a monoalkanolamine or a derivative thereof may be used either instead of, or together with, the dialkanolamine or derivative thereof.

The monoalkanolamine derivative can be produced, for example, in a similar manner to that that described above for the dialkanolamine, by performing a Michael addition reaction of a vinyl monomer having a group represented by R$^1$ to the monoalkanolamine.

This introduction of a side chain by a Michael addition reaction is usually performed on the dialkanolamine monomer prior to the urethanization reaction, but may also be performed after the polymerization, on those units derived from the dialkanolamine in the urethane compound.

Examples of compounds that may be used as the vinyl monomer include monomers having an acryloyloxy group such as an acrylate, monomers having an acryloyl group, acrylamides, and monomers having a vinyl group.

For example, in the case where an acrylate having a group represented by R$^1$ and a dialkanolamine are subjected to a Michael addition reaction, the reaction proceeds as shown in the equation below, thus obtaining a dialkanolamine derivative.

[Chemical formula 3]

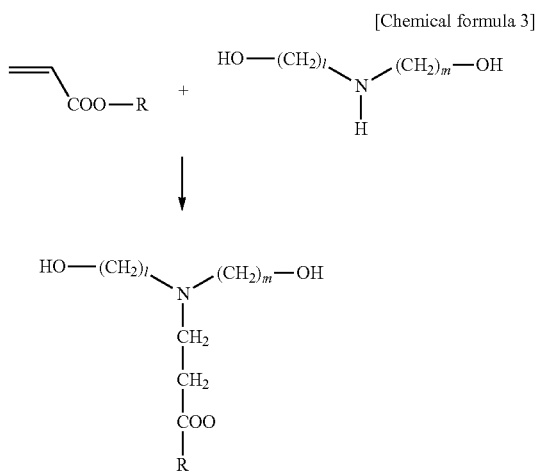

(1) Side Chain Derived from Acrylate

In one example of the urethane compound, the side chain R in the above formula (1) is represented by —(CH$_2$)$_2$—COO—R$^{1a}$, wherein R$^{1a}$ represents a hydrogen atom, an aromatic ring-containing group, a heterocyclic ring-containing group or a fluoroalkyl group having one or more fluorine atoms, and may have a substituent.

By using this type of urethane compound, the ink repellency from the nozzle plate and the wiping resistance, together with the level of image show-through and the image density can all be improved.

If the side chains of the urethane compound have a carboxyl group, an aromatic ring or a heterocyclic ring, then the ink storage stability can also be favorably maintained.

Further, if the side chains of the urethane compound have a fluoroalkyl group having one or more fluorine atoms, then the abrasion resistance of the printed item and the fixation to the recording medium can also be improved.

The case where R$^{1a}$ is a hydrogen atom is equivalent to introducing a carboxyl group into the side chains of the urethane compound.

Examples of the aromatic ring-containing groups for R$^{1a}$ include the functional groups shown below.

[Chemical formula 4]

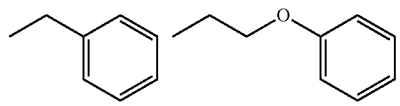

Examples of the heterocyclic ring-containing groups for R$^{1a}$ include the functional groups shown below.

[Chemical formula 5]

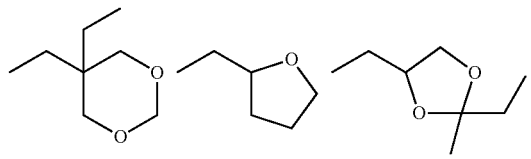

Among the various possibilities for $R^{1a}$, the fluoroalkyl group having one or more fluorine atoms is preferably a linear or branched alkyl group having a carbon number of 1 to 10 in which at least 50%, and more preferably 80% or more, of the (number of) hydrogen atoms have been substituted with fluorine atoms. Examples of the fluoroalkyl group include the functional groups shown below.

[Chemical formula 6]

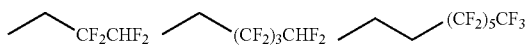

In the production of the urethane compound described above, a dialkanolamine derivative obtained by introducing one of the monomers shown below at the nitrogen atom "N" of the dialkanolamine "OH—$(CH_2)_m$—NH—$(CH_2)_n$—OH" can be used. Introducing an acrylate having an aromatic ring is preferred.

[Chemical formula 7]

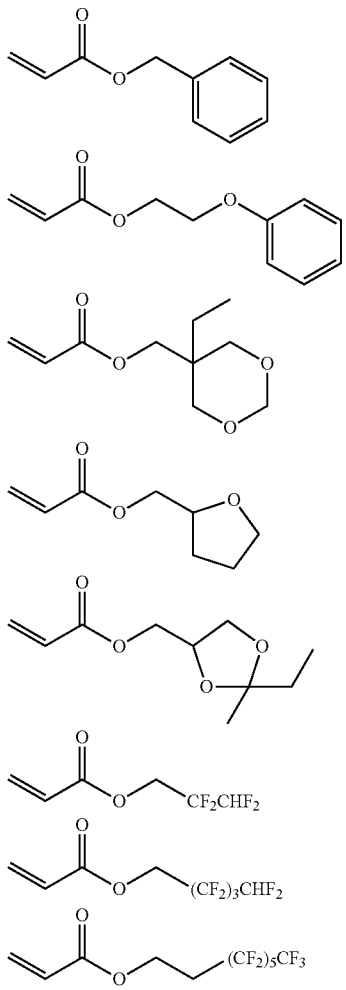

Further, in one example of the urethane compound, the side chain R in the above formula (1) is represented by —$(CH_2)_2$—COO—$R^{1a}$, wherein $R^{1a}$ represents a nitrogen atom-containing group, which may have a substituent.

In the production of this urethane compound, a dialkanolamine derivative obtained by introducing dimethylaminomethyl acrylate, dimethylaminoethyl acrylate, or diethylaminoethyl acrylate or the like at the nitrogen atom "N" of the dialkanolamine "OH—$(CH_2)_m$—NH—$(CH_2)_n$—OH" can be used.

(2) Side Chain Derived from Acrylamide

In one example of the urethane compound, the side chain R in the above formula (1) is represented by —$(CH_2)_2$—$R^{1b}$, wherein $R^{1b}$ represents an amide linkage-containing group represented by formula (2) shown below.

$$-CO-NR'R'' \quad (2)$$

In formula (2), each of R' and R'' independently represents a hydrogen atom or an alkyl group, or alternatively, N, R' and R'' may form a heterocyclic ring. The alkyl group or the heterocyclic ring may have a substituent.

By using this type of urethane compound, the ink repellency from the nozzle plate and the wiping resistance, together with the level of image show-through and the image density can all be improved.

By including an amide linkage-containing group in the side chains of the urethane compound, the storage stability of the ink can also be maintained favorably.

The case where R' and R'' are both hydrogen atoms is equivalent to introducing an amide group into the side chains of the urethane compound.

The case where one of R' and R'' is an alkyl group and the other is a hydrogen atom is equivalent to introducing a monoalkylamide group into the side chains of the urethane compound.

The case where R' and R'' are both alkyl groups is equivalent to introducing a dialkylamide group into the side chains of the urethane compound.

The alkyl groups of the monoalkylamide group and the dialkylamide group may each independently include a substituent such as an amino group or a hydroxyl group.

By including a monoalkylamide group or a dialkylamide group in the side chains of the urethane compound, the wiping resistance can be further improved.

R' and R'' may form a heterocyclic ring with the nitrogen atom "N" of —CO—NR'R''.

Examples of —NR'R'' include the functional groups shown below.

[Chemical formula 8]

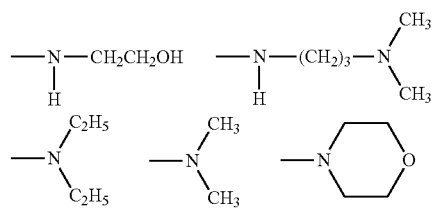

In the production of the urethane compound described above, a dialkanolamine derivative obtained by introducing one of the monomers shown below at the nitrogen atom of the dialkanolamine can be used. Introducing an N-acrylamide, N,N-diacrylamide or acrylamide having a heterocyclic ring is preferred.

[Chemical formula 9]

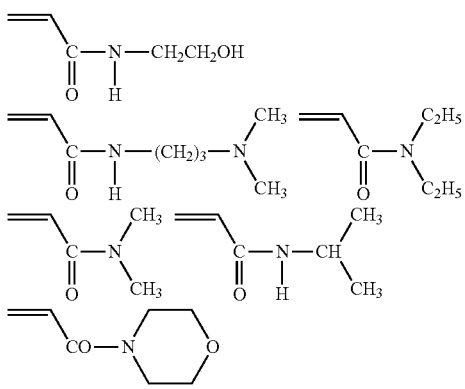

(3) Side Chain Derived from Acrylonitrile

In one example of the urethane compound, the side chain R in the above formula (1) is represented by —$(CH_2)_2$—$R^{1c}$, wherein $R^{1c}$ represents a nitrile group.

In the production of this type of urethane compound, a dialkanolamine derivative obtained by introducing acrylonitrile shown below at the nitrogen atom of the dialkanolamine can be used.

[Chemical formula 10]

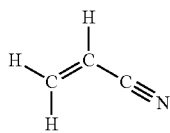

By using this type of urethane compound, the ink repellency from the nozzle plate and the wiping resistance, together with the level of image show-through and the image density can all be improved.

By including a nitrile group in the side chains of the urethane compound, the wiping resistance can be further improved, and the storage stability of the ink can also be favorably maintained.

The urethane compound may have either one type, or two or more types, of the side chain structures described above. A urethane compound having two or more types of side chains can be obtained by reacting the polyvalent isocyanate compound with two or more dialkanolamine derivatives having different functional groups.

It is preferable that the urethane compound has first side chains having an aromatic ring, and second side chains having a heterocyclic ring, a carboxyl group, an amide linkage, a fluoroalkyl group having one or more fluorine atoms, or a nitrile group. By including the second side chains in the urethane compound, the respective effects of the different side chains can be achieved, and by including an aromatic ring in the first side chains, the ink repellency from the nozzle plate can be reliably improved. The molar ratio between the first side chains and the second side chains is preferably within a range from 25:75 to 75:25.

In the urethane compound, in the formula (1) shown above, the unit derived from the polyvalent isocyanate preferably includes a Y group having one of the following structures:

a linear or branched alkylene group having a carbon number of 1 to 8, a divalent group having an aromatic ring such as a benzene or naphthalene, or a divalent group having a cycloalkane such as a cyclohexane or norbornene.

The polyvalent isocyanate used in producing this type of urethane compound is a compound having two or more isocyanate groups, and may be an aliphatic polyisocyanate, an alicyclic polyisocyanate, or an aromatic polyisocyanate or the like.

Specific examples of the polyvalent isocyanate include:

diisocyanates such as 1,6-diisocyanatohexane, 1,3-bis(isocyanatomethyl)benzene, 1,3-bis(isocyanatomethyl)cyclohexane, 1,5-naphthalene diisocyanate, diphenylmethane-4,4-diisocyanate, hexamethylene diisocyanate and meta-xylylene diisocyanate;

triisocyanates such as 1-methylbenzene-2,4,6-triyltriisocyanate and 1,6,11-triisocyanatoundecane; and polyisocyanates such as polymethylene polyphenyl polyisocyanate.

Further, examples of compounds having three or more isocyanate groups that can be used as the polyvalent isocyanate compound include polyvalent isocyanate compounds containing an isocyanurate ring, polyvalent isocyanate compounds containing an adduct structure, polyvalent isocyanate compounds containing a biuret structure, and polyvalent isocyanate compounds containing an uretdione structure.

Examples of polyvalent isocyanate compounds containing an isocyanurate ring include hexamethylene diisocyanate isocyanurate and 3-isocyanatomethyl-3,5,5-trimethyl-cyclohexyl isocyanate isocyanurate. Further, an example of a polyvalent isocyanate compound containing an adduct structure is hexamethylene diisocyanate containing an adduct structure.

Divalent diisocyanates can be used particularly favorably.

In addition to the unit derived from the polyvalent isocyanate and the unit derived from the alkanolamine, the urethane compound may also contain a unit derived from another polyhydric alcohol besides the alkanolamine. By using a polyhydric alcohol that does not have a side chain as this other polyhydric alcohol, crystallization of the urethane compound in the ink solvent can be prevented, and better miscibility with the ink solvent can be achieved.

Examples of the other polyhydric alcohol include ethylene glycol, diethylene glycol, propylene glycol, dipropylene glycol, 1,3-propanediol, polyethylene glycol and polypropylene glycol. Either one type of unit, or a combination of two or more types of units, derived from these polyhydric alcohols may be incorporated in the urethane compound.

Among the various possibilities, the urethane compound preferably includes a unit derived from an asymmetric glycol. This asymmetric glycol is preferably a propylene glycol or polypropylene glycol having a carbon number of 3 to 600.

The urethane compound preferably includes the unit derived from the alkanolamine and the unit derived the other polyhydric alcohol in a molar ratio (alkanolamine:other polyhydric alcohol) within a range from 25:75 to 75:25.

The urethane compound represented by formula (1) can be produced by reacting a polyhydric alcohol containing diethanolamine and also containing another polyhydric alcohol as required, and a polyvalent isocyanate, in a low-boiling point aprotic solvent such as methyl ethyl ketone.

The polyhydric alcohol and the polyvalent isocyanate are preferably reacted in a ratio that provides 0.60 to 1.02 mol of isocyanate groups in the polyvalent isocyanate per 1.0 mol of hydroxyl groups in the polyhydric alcohol.

The weight-average molecular weight (Mw, GPC method, referenced against standard polystyrenes) of the urethane compound is preferably from 2,000 to 40,000. If this weight-average molecular weight is lower than 2,000, then there is a possibility that the urethane compound may float free within the ink solvent, making it impossible to maintain the encapsulated state of the pigment. If the weight-average molecular weight of the urethane compound is higher than 40,000, then very large encapsulated particles are generated, which can cause a reduction in stability and a deterioration in the discharge properties. The weight-average molecular weight of the urethane compound is more preferably from 2,000 to 30,000, and even more preferably from 4,000 to 20,000.

The urethane compound preferably represents 0.01 to 30% by mass, and more preferably 1 to 20% by mass, of the total mass of the ink.

The oil-based ink may also contain a pigment dispersant to stabilize the dispersibility of the encapsulated pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyether ester anionic surfactants, naphthalenesulfonic acid formalin condensate salts, polyoxyethylene alkyl phosphate esters, polyoxyethylene nonylphenyl ethers, polyester polyamines, stearylamine acetate and polyethyleneimine-based compounds, and among these, the use of a polymeric dispersant is preferred.

Examples of commercially available pigment dispersants include the Solsperse products 5000 (a phthalocyanine ammonium salt-based dispersant), 13940 (a polyester amine-based dispersant), 17000 and 18000 (aliphatic amine-based dispersants), and 11200, 22000, 24000, 28000 and 7100 (all product names) manufactured by The Lubrizol Corporation, Efka 400, 401, 402, 403, 450, 451 and 453 (modified polyacrylates), and Efka 46, 47, 48, 49, 4010 and 4055 (modified polyurethanes) (all product names) manufactured by Efka Chemicals BV, Demol P and EP, Poiz 520, 521 and 530, and Homogenol L-18 (polycarboxylate polymeric surfactants) (all product names) manufactured by Kao Corporation, Disparlon KS-860 and KS-873N4 (high-molecular weight polyester amine salts) (product names) manufactured by Kusumoto Chemicals, Ltd., Discol 202, 206, OA-202 and OA-600 (multi-chain polymeric nonionic dispersants) (all product names) manufactured by DKS Co., Ltd., DISPERBYK 2155 and 9077 manufactured by BYK Chemie Japan K.K., and Hypermer KD2, KD3, KD11 and KD12 manufactured by Croda Japan Co., Ltd.

The amount of the pigment dispersant need only be sufficient to ensure satisfactory dispersion of the aforementioned pigment within the ink, and may be set as appropriate. For example, in terms of mass ratio, the pigment dispersant may be added in an amount of 0.1 to 5 relative to a value of 1 for the pigment.

Comb-shaped polyamide-based dispersants having a plurality of side chains composed of polyester chains can be used favorably as the pigment dispersant. Comb-shaped polyamide-based dispersants can be procured as commercial products such as Solsperse 11200 and Solsperse 28000 (both product names) manufactured by The Lubrizol Corporation.

Both non-polar organic solvents and polar organic solvents can be used as the non-aqueous solvent. These solvents may be used individually, or in combinations containing two or more solvents. In one embodiment, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JX Nippon Oil & Energy Corporation); and Isopar G, Isopar H, Isopar L, Isopar M, Exxsol D40, Exxsol D60, Exxsol D80, Exxsol D95, Exxsol D110 and Exxsol D130 (all manufactured by TonenGeneral Sekiyu K.K.).

Examples of preferred aromatic hydrocarbon solvents include Grade Alkene L and Grade Alkene 200P (both manufactured by JX Nippon Oil & Energy Corporation), and Solvesso 100, Solvesso 150, Solvesso 200 and Solvesso 200ND (manufactured by TonenGeneral Sekiyu K.K.).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

Specific examples include fatty acid ester-based solvents having a carbon number of at least 13, and preferably a carbon number of 16 to 30, within a single molecule, such as isononyl isononanoate, isodecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate;

higher alcohol-based solvents having a carbon number of at least 6, and preferably a carbon number of 12 to 20, within a single molecule, such as isomyristyl alcohol, isopalmityl alcohol, isostearyl alcohol, oleyl alcohol, isoeicosyl alcohol and decyltetradecanol; and higher fatty acid-based solvents having a carbon number of at least 12, and preferably a carbon number of 14 to 20, within a single molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

In a method for producing the encapsulated pigment according to one embodiment, a urethane compound solution containing the aforementioned urethane compound dissolved in a low-boiling point aprotic solvent is preferably used.

Examples of the low-boiling point aprotic solvent include amide-based solvents such as dimethylformamide, diethylformamide, dimethylacetamide and N-methylpyrrolidone, sulfoxide-based solvents such as dimethyl sulfoxide, ketone-based solvents such as methyl ethyl ketone, cyclohexanone and methyl isobutyl ketone, ether-based solvents such as tetrahydrofuran and dioxane, ester-based solvents such as methyl acetate, ethyl acetate and butyl acetate, and aromatic hydrocarbon-based solvents such as toluene and xylene.

This urethane compound solution may simply use the solution obtained following reaction of the aforementioned polyvalent isocyanate and alkanolamine derivative in a low-boiling point aprotic solvent, with the addition of a dilution solvent as required.

The encapsulated pigment can then be produced by mixing the urethane compound solution, the high-boiling point solvent for the ink, the pigment, and other optional components such as a pigment dispersant, dispersing the mixture with a dispersion device such as a beads mill, and then removing the low-boiling point solvent from the pigment dispersion. Removal of the low-boiling point solvent may be performed under pressure or under heating, by distillation or the like. If desired, the pigment dispersion may also be filtered through a membrane filter or the like.

The thus obtained encapsulated pigment dispersion can be used without further modification as the oil-based ink, although a dilution solvent or the like may be added if necessary.

In the oil-based ink, the encapsulated pigment preferably represents 1 to 40% by mass, and more preferably 5 to 30% by mass, of the total mass of the ink.

Further, in the oil-based ink, the amount of the urethane compound, reported as a mass ratio relative to a value of 1 for the pigment, is preferably from 0.1 to 5.

The oil-based ink preferably has a non-volatile fraction of 1 to 40% by mass. The amount added of the ink solvent may be adjusted so as to achieve this non-volatile fraction.

Furthermore, in the production process for the encapsulated pigment, the low-boiling point aprotic solvent is preferably used in a satisfactorily large amount, in order to prevent aggregation or the like when the urethane compound is mixed with the ink solvent. The amount added of the low-boiling point aprotic solvent preferably represents a mass ratio of 1 to 15 relative to a value of 1 for the urethane compound.

In addition to the various components described above, the oil-based ink may also include various additives, provided these additives do not impair the object of the present invention. For example, nozzle blockage inhibitors, antioxidants, conductivity modifiers, viscosity modifiers, surface tension regulators, and oxygen absorbers and the like may be added as appropriate. Further, from the viewpoint of the color development properties, a dye may be used in combination with the encapsulated pigment. There are no particular limitations on these additives and dyes, and materials typically used in this technical field may be used.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and most preferably about 10 mPa·s. In this description, the viscosity refers to the viscosity value at 10 Pa when the shear stress is raised from 0 Pa at a rate of 0.1 Pa/s and at a temperature of 23° C.

There are no particular limitations on the printing method used with the inkjet ink, and any of various printing systems, including a piezo system, electrostatic system or thermal system may be used. In those cases where an inkjet recording device is used, the ink of the embodiment is preferably discharged from the inkjet head based on a digital signal, with the discharged ink droplets being adhered to a recording medium.

In one embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

Second Embodiment

A second embodiment is described below. In the description of the second embodiment, those items for which there is no particular description are the same as the first embodiment.

An oil-based inkjet ink according to one embodiment of the present invention (hereafter sometimes abbreviated as simply "the ink") comprises an encapsulated pigment containing a pigment and a urethane compound that coats the surface of the pigment, and a non-aqueous solvent, wherein the urethane compound has a urethane skeleton and one or more side chains and is insoluble in the non-aqueous solvent, and the side chains of the urethane compound contain an alkoxysilyl group and one or more moieties selected from the group consisting of an aromatic ring, a heterocyclic ring, a carboxyl group, an amide linkage, a fluoroalkyl group having one or more fluorine atoms, and a nitrile group.

The ink of this embodiment exhibits excellent repellency by the nozzle plate, prevents degradation of the nozzle plate, and can also reduce image show-through and enhance the image density.

The urethane compound contains a plurality of alkoxysilyl groups, and it is preferable that at least a portion of this plurality of alkoxysilyl groups forms one or more siloxane linkages.

This ink comprises an encapsulated pigment and a non-aqueous solvent, wherein the encapsulated pigment contains a pigment and a urethane compound that coats the surface of the pigment. The non-aqueous solvent, the pigment and the solubility of the urethane compound in the non-aqueous solvent are all the same as described above in the first embodiment. Further, a pigment dispersant and any of various additives may be included in the ink, in the same manner as described for the first embodiment.

The urethane compound has a urethane skeleton and one or more side chains. These side chains preferably contain an alkoxysilyl group (hereafter also referred to as "side chain B"), and one or more moieties selected from the group consisting of an aromatic ring, a heterocyclic ring, a carboxyl group, an amide linkage, a fluoroalkyl group having one or more fluorine atoms, and a nitrile group (hereafter also referred to as "side chain A").

Because the urethane compound contains amino groups within the main chain, it has a flexible structure that exhibits basic-like properties and extensibility. By incorporating alkoxysilyl groups in the urethane compound, the alkoxysilyl groups form one or more siloxane linkages when solvent removal is performed, which causes resin crosslinking to occur at the surface of the encapsulated pigment, and enables the abrasion resistance of the printed item to be further enhanced.

It is preferable that the urethane compound contains a plurality of alkoxysilyl groups, and that at least a portion of the plurality of alkoxysilyl groups forms one or more siloxane linkages.

For the alkoxysilyl group, one or more groups selected from the group consisting of monoalkoxysilyl groups, dialkoxysilyl groups and trialkoxysilyl groups may be used.

The alkoxysilyl group is, for example, a functional group represented by the general formula —Si($R^1$)($R^2$)($R^3$).

In the above general formula, each of $R^1$, $R^2$ and $R^3$ independently represents an alkoxy group having a carbon number of 1 to 10, an alkyl group having a carbon number of 1 to 10 or a hydrogen atom, provided that at least one of $R^1$, $R^2$ and $R^3$ is an alkoxy group having a carbon number of 1 to 10, and preferably a carbon number of 1 to 4.

Examples of the alkoxy group having a carbon number of 1 to 10 include a methoxy group, ethoxy group, propoxy group, isopropoxy group, butoxy group, isobutoxy group, pentoxy group, methyl-n-butoxy group, dimethyl-n-propoxy group, ethyl-n-propoxy group, hexyloxy group, methyl-n-pentyloxy group, 1,1-dimethyl-n-butoxy group, 1,2-dimethyl-n-butoxy group, dimethyl-n-butoxy group, ethyl-n-butoxy group, trimethyl-n-propoxy group and ethyl-methyl-n-propoxy group. The carbon number of the alkoxy group is preferably from 1 to 4.

Examples of the alkyl group having a carbon number of 1 to 10 include a methyl group, ethyl group, propyl group, isopropyl group, cyclopropyl group, butyl group, isobutyl group, cyclobutyl group, methyl-cyclopropyl group, pentyl group, methyl-n-butyl group, dimethyl-n-propyl group, ethyl-n-propyl group, cyclopentyl group, methyl-cyclobutyl group, dimethyl-cyclopropyl group, ethyl-cyclopropyl group, hexyl group, methyl-n-pentyl group, dimethyl-n-butyl group, ethyl-n-butyl group, trimethyl-n-propyl group, ethyl-methyl-n-propyl group, cyclohexyl group, methyl-cyclopentyl group, ethyl-cyclobutyl group, dimethyl-cyclobutyl group, propyl-cyclopropyl group, isopropyl-cyclopropyl group, trimethyl-cyclopropyl group and ethyl-methyl-cyclopropyl group. The carbon number of the alkyl group is preferably from 1 to 4.

Examples of preferred alkoxysilyl group include a trimethoxysilyl group, triethoxysilyl group, triisopropoxysilyl group, methyldimethoxysilyl group, methyldiethoxysilyl group, ethyldimethoxysilyl group, ethyldiethoxysilyl group, phenyldimethoxysilyl group, dimethylmethoxysilyl group, dimethoxyphenylsilyl group, 2-(trimethoxsilyl)ethyl group, 3-(trimethoxsilyl)propyl group, 4-(trimethoxsilyl)butyl group, 6-(trimethoxsilyl)hexyl group, 2-(triethoxsilyl)ethyl group, 3-(triethoxsilyl)propyl group, 4-(triethoxsilyl)butyl group, 2-(dimethoxymethylsilyl)ethyl group, 3-(dimethoxymethylsilyl)propyl group, 4-(dimethoxymethylsilyl) butyl group, 2-(diethoxymethylsilyl)ethyl group, 3-(diethoxymethylsilyl)propyl group, 4-(diethoxymethylsilyl) butyl group, 2-(dimethoxyethylsilyl)ethyl group, 2-(diethoxyethylsilyl)ethyl group, 2-(diethylmethoxysilyl) ethyl group and 2-(dimethylethoxysilyl)ethyl group.

Either one of these groups or a plurality of different groups may be incorporated in a single urethane compound.

Examples of compounds that can be used as the urethane compound include compounds having a main chain composed of a urethane skeleton, and side chains that have been bonded to the main chain by graft polymerization. A structure obtained by reacting a polyvalent isocyanate and a polyhydric alcohol can be used as the urethane skeleton.

The urethane compound may have a structure in which a unit derived from a polyvalent isocyanate and a unit derived from a polyhydric alcohol are arranged alternately, wherein the units derived from a polyhydric alcohol include a unit derived from an alkanolamine, and the side chains A of the urethane compound are bonded to the urethane compound via the nitrogen atom of the unit derived from the alkanolamine.

This type of urethane compound can be obtained by reacting a polyvalent isocyanate with an alkanolamine or a derivative thereof.

In the same manner as described above for the first embodiment, a monoalkanolamine, a dialkanolamine, or a derivative thereof, or alternatively, a combination of two or more such compounds, can be used as the alkanolamine.

The alkanolamine is preferably a compound obtained by reacting a compound containing one or more moieties (the side chain A) selected from the group consisting of an aromatic ring, a heterocyclic ring, a carboxyl group, an amide linkage, a fluoroalkyl group having one or more fluorine atoms, and a nitrile group with an alkanolamine by the Michael addition reaction. Details regarding this reaction are as described above for the first embodiment.

In the same manner as described above for the first embodiment, the polyvalent isocyanate is a compound having two or more isocyanate groups, and an aliphatic polyisocyanate, an alicyclic polyisocyanate, an aromatic polyisocyanate, or a combination of two or more such compounds may be used.

In the same manner as described above for the first embodiment, the urethane compound may also contain, in addition to the unit derived from the polyvalent isocyanate and the unit derived from the alkanolamine, a unit derived from another polyhydric alcohol besides the alkanolamine.

The urethane compound preferably represents 0.01 to 30% by mass, and more preferably 1 to 20% by mass, of the total mass of the ink.

In one embodiment, the urethane compound also includes an alkoxysilyl group (the side chain B) as side chains. Methods used for introducing the alkoxysilyl group into the urethane compound are described below.

(1) Alkanolamine-Derived Alkoxysilyl Group-Containing Urethane Compound

Examples of alkanolamine-derived alkoxysilyl group-containing urethane compounds include compounds having a structure in which a unit derived from a polyvalent isocyanate and a unit derived from a polyhydric alcohol are arranged alternately, wherein the unit derived from a polyhydric alcohol includes a unit derived from an alkanolamine, and the units derived from an alkanolamine include a unit A derived from an alkanolamine to which a compound having one or more moieties selected from the group consisting of an aromatic ring, a heterocyclic ring, a carboxyl group, an amide linkage, a fluoroalkyl group having one or more fluorine atoms, and a nitrile group has been added by a Michael addition, and a unit B derived from an alkanolamine having an alkoxysilyl group.

The unit B derived from an alkanolamine having an alkoxysilyl group preferably includes at least one type of unit selected from the group consisting of units B1 derived from an alkanolamine to which a compound having an alkoxysilyl group and an unsaturated double bond has been added by a Michael addition, and units B2 derived from an alkanolamine into which an alkoxysilyl group has been introduced by reaction with a compound having an alkoxysilyl group and an epoxy group.

One example of the method used for producing this alkoxysilyl group-containing urethane compound is a method in which an alkanolamine derivative (hereafter referred to as the "alkanolamine derivative A") prepared by adding a compound having a side chain A to an alkanolamine by a Michael addition, and an alkanolamine derivative (hereafter referred to as the "alkanolamine derivative B1") prepared by adding a compound having an alkoxysilyl group and an unsaturated double bond to an alkanolamine by a Michael addition, are reacted with a polyvalent isocyanate.

The alkanolamine derivative A and the polyvalent isocyanate are the same as described above in the first embodiment.

A compound prepared by adding a compound having an alkoxysilyl group and an unsaturated double bond to an alkanolamine by a Michael addition can be used as the alkanolamine derivative B1. The type of alkanolamine used and the method used for the Michael addition are as described above for the first embodiment.

Examples of the unsaturated double bond include a vinyl group, acryloyl group, acrylamide group and acryloyloxy group.

Examples of compounds that can be used favorably as the compound having an alkoxysilyl group and an unsaturated double bond include:

3-acryloxypropyltrimethoxysilane,
acryloxymethyltrimethoxysilane,
acryloxymethylmethyldimethoxysilane,
acryloxymethyltriethoxysilane,
acryloxymethylmethyldiethoxysilane,
vinyltrimethoxysilane,
vinyltriethoxysilane,
vinyldimethoxymethylsilane,
vinyldiethoxymethylsilane, and
vinyltris(2-methoxyethoxy)silane.

These compounds may be used individually, or a combination of two or more compounds may be used.

One example of another method for producing this alkoxysilyl group-containing urethane compound is a method in which an alkanolamine derivative (the alkanolamine derivative A) prepared by adding a compound having a side chain A to an alkanolamine by a Michael addition, and an alkanolamine derivative (hereafter referred to as the "alkanolamine derivative B2") prepared by reacting an alkanolamine with a compound having an alkoxysilyl group and an epoxy group-containing group to introduce an alkoxysilyl group into the alkanolamine, are reacted with a polyvalent isocyanate.

The alkanolamine derivative A and the polyvalent isocyanate are the same as described above in the first embodiment.

A compound prepared by reacting a compound having an alkoxysilyl group and an epoxy group-containing group with an alkanolamine can be used as the alkanolamine derivative B2. The type of alkanolamine used is as described above for the first embodiment.

Examples of groups that can be used as the epoxy group-containing group include an epoxy group, a glycidyl group and a glycidoxy group.

Examples of compounds that can be used favorably as the compound having an alkoxysilyl group and an epoxy group-containing group include:

3-glycidoxypropyltrimethoxysilane,
3-glycidoxypropyltriethoxysilane,
3-glycidoxypropylmethyldimethoxysilane, and
3-glycidoxypropylmethyldiethoxysilane.

These compounds may be used individually, or a combination of two or more compounds may be used.

In the alkanolamine-derived alkoxysilyl group-containing urethane compound (1), the amount of alkoxysilyl groups relative to the total mass of the urethane compound, calculated as an equivalent amount of the alkoxysilyl group-containing alkanolamine, is preferably at least 0.01% by mass, more preferably at least 0.1% by mass, and even more preferably 1.0% by mass or greater. This enables the abrasion resistance of the printed item and the fixation to be further improved.

On the other hand, the amount of alkoxysilyl groups relative to the total mass of the urethane compound, calculated as an equivalent amount of the alkoxysilyl group-containing alkanolamine, is preferably not more than 20% by mass, more preferably not more than 11% by mass, and even more preferably 5% by mass or less. This ensures that the urethane compound has sufficient flexibility, enhances the pigment coating properties, and can improve the wiping resistance and the image density.

In the alkanolamine-derived alkoxysilyl group-containing urethane compound (1), the amount of the side chains A relative to the total mass of the urethane compound, calculated as an equivalent amount of the side chain A-containing alkanolamine, is preferably at least 10% by mass, more preferably at least 20% by mass, and even more preferably 25% by mass or greater.

On the other hand, in the alkanolamine-derived alkoxysilyl group-containing urethane compound, the amount of the side chains A relative to the total mass of the urethane compound, calculated as an equivalent amount of the side chain A-containing alkanolamine, is preferably not more than 50% by mass, and more preferably 40% by mass or less.

In the case where a plurality of types of side chains A exist, the above amounts refer to total amounts.

The urethane compound preferably has, as the side chains A, first side chains having an aromatic ring, and second side chains having a heterocyclic ring, a carboxyl group, an amide linkage, a fluoroalkyl group having one or more fluorine atoms or a nitrile group. The molar ratio between these first side chains and second side chains is preferably within a range from 25:75 to 75:25.

In the alkanolamine-derived alkoxysilyl group-containing urethane compound (1), the combined amount of the alkoxysilyl groups and the side chains A relative to the total mass of the urethane compound, calculated using the equivalent amounts of the alkoxysilyl group-containing alkanolamine and the side chain A-containing alkanolamine, is preferably from 10 to 55% by mass, and more preferably from 20 to 45% by mass.

(2) Mercapto Compound-Derived Alkoxysilyl Group-Containing Urethane Compound

Examples of mercapto compound-derived alkoxysilyl group-containing urethane compounds include compounds having a structure in which a unit derived from a polyvalent isocyanate and a unit derived from a polyhydric alcohol are arranged alternately, wherein the units derived from the polyhydric alcohol include a unit A derived from an alkanolamine to which a compound having one or more moieties selected from the group consisting of an aromatic ring, a heterocyclic ring, a carboxyl group, an amide linkage, a fluoroalkyl group having one or more fluorine atoms, and a nitrile group has been added by a Michael addition, and the alkoxysilyl group has been introduced via a mercapto group at the an isocyanate group of the urethane compound.

One example of the method used for producing this mercapto compound-derived alkoxysilyl group-containing urethane compound is a method in which an alkanolamine derivative (hereafter referred to as the "alkanolamine derivative A") prepared by adding a compound having a side chain A to an alkanolamine by a Michael addition, and a polyvalent isocyanate are reacted to obtain a urethane compound, and subsequently, this urethane compound and a compound containing a mercapto group and an alkoxysilyl group (the mercapto compound) are reacted, thereby reacting the mercapto group of the mercapto compound with the an isocyanate group of the urethane compound to bond the mercapto compound.

The alkanolamine derivative A and the polyvalent isocyanate are the same as described above in the first embodiment.

Examples of compounds that can be used favorably as the compound containing a mercapto group and an alkoxysilyl group include 3-mercaptopropyltrimethoxysilane, 3-mercaptopropyltriethoxysilane and 3-mercaptopropyl(diethoxy)methylsilane.

These compounds may be used individually, or a combination of two or more compounds may be used.

The mercapto compound-derived alkoxysilyl group-containing urethane compound (2) can be obtained by reacting the alkanolamine derivative A, the polyvalent isocyanate and the mercapto compound in an aprotic solvent, with the addition of an optional catalyst is required. Alternatively, the alkanolamine derivative A and the polyvalent isocyanate may be reacted together, and the isocyanate group of the resulting urethane compound then reacted with the mercapto compound.

In the mercapto compound-derived alkoxysilyl group-containing urethane compound (2), the amount of alkoxysilyl groups relative to the total mass of the urethane compound, calculated as an equivalent amount of the alkoxysilyl group-containing mercapto compound, is preferably at least 0.01% by mass, more preferably at least 0.1% by mass, and even more preferably 1.0% by mass or greater. This enables the abrasion resistance of the printed item and the fixation to be further improved.

On the other hand, the amount of alkoxysilyl groups relative to the total mass of the urethane compound, calculated as an equivalent amount of the alkoxysilyl group-containing mercapto compound, is preferably not more than 10% by mass, more preferably not more than 5% by mass, and even more preferably 3% by mass or less. This ensures that the urethane compound has sufficient flexibility, enhances the pigment coating properties, and can also improve the wiping resistance and the image density.

In the mercapto compound-derived alkoxysilyl group-containing urethane compound (2), the preferred ranges for the amount of the side chains A, the molar ratio within the side chains A between the first side chains and the second side chains, and the combined amount of the alkoxysilyl groups and the side chains A are the same as those described above for the alkanolamine-derived alkoxysilyl group-containing urethane compound (1).

(3) Isocyanate Compound-Derived Alkoxysilyl Group-Containing Urethane Compound

Examples of isocyanate compound-derived alkoxysilyl group-containing urethane compounds include compounds having a structure in which a unit derived from a polyvalent isocyanate and a unit derived from a polyhydric alcohol are arranged alternately, wherein the units derived from the polyhydric alcohol include a unit A derived from an alkanolamine to which a compound having one or more moieties selected from the group consisting of an aromatic ring, a heterocyclic ring, a carboxyl group, an amide linkage, a fluoroalkyl group having one or more fluorine atoms, and a nitrile group has been added by a Michael addition, and the alkoxysilyl group has been introduced via the isocyanate group at the hydroxyl group of the urethane compound.

One example of the method used for producing this isocyanate compound-derived alkoxysilyl group-containing urethane compound is a method in which an alkanolamine derivative (hereafter referred to as the "alkanolamine derivative A") prepared by adding a compound having a side chain A to an alkanolamine by a Michael addition, and a polyvalent isocyanate are reacted to obtain a urethane compound, and subsequently, this urethane compound and a compound containing an isocyanate group and an alkoxysilyl group (the isocyanate compound) are reacted, thereby reacting the isocyanate group of the isocyanate compound with the hydroxyl group of the urethane compound to bond the isocyanate compound. The hydroxyl group of the urethane compound include hydroxyl groups derived from the alkanolamine, hydroxyl groups derived from an optionally added polyhydric alcohol, and hydroxyl groups that have been introduced into the alkanolamine derivative.

The alkanolamine derivative A and the polyvalent isocyanate are the same as described above in the first embodiment.

Examples of compounds that can be used favorably as the compound containing an isocyanate group and an alkoxysilyl group include 3-isocyanatopropyltriethoxysilane and 3-isocyanatopropyltrimethoxysilane.

These compounds may be used individually, or a combination of two or more compounds may be used.

The isocyanate compound-derived alkoxysilyl group-containing urethane compound (3) can be obtained by reacting the alkanolamine derivative A, the polyvalent isocyanate and the isocyanate compound in an aprotic solvent, with the addition of an optional catalyst is required. Alternatively, the alkanolamine derivative A and the polyvalent isocyanate may be reacted together, and the hydroxyl groups of the resulting urethane compound then reacted with the isocyanate compound.

In the isocyanate compound-derived alkoxysilyl group-containing urethane compound (3), the amount of alkoxysilyl groups relative to the total mass of the urethane compound, calculated as an equivalent amount of the alkoxysilyl group-containing isocyanate compound, is preferably at least 0.01% by mass, more preferably at least 0.1% by mass, and even more preferably 1.0% by mass or greater. This enables the abrasion resistance of the printed item and the fixation to be further improved.

On the other hand, the amount of alkoxysilyl groups relative to the total mass of the urethane compound, calculated as an equivalent amount of the alkoxysilyl group-containing isocyanate compound, is preferably not more than 10% by mass, more preferably not more than 5% by mass, and even more preferably 3% by mass or less. This ensures that the urethane compound has sufficient flexibility, enhances the pigment coating properties, and can also improve the wiping resistance and the image density.

In the isocyanate compound-derived alkoxysilyl group-containing urethane compound (3), the preferred ranges for the amount of the side chains A, the molar ratio within the side chains A between the first side chains and the second side chains, and the combined amount of the alkoxysilyl groups and the side chains A are the same as those described above for the alkanolamine-derived alkoxysilyl group-containing urethane compound (1).

EXAMPLES

The present invention is described below in further detail using a series of examples. The present invention is in no way limited by the following examples.

Production Example A

Examples 1 to 20 and Comparative Examples 1 to 4 are described below as examples of the Production Example A.
<Diol Synthesis>
Diol raw material formulations are shown in Table 1.

A 300 mL four-neck flask was charged with 105.1 g of diethanolamine (molecular weight (Mw): 105.1), and the temperature was raised to 110° C. with constant stirring under a stream of nitrogen gas. For each diol, the monomer shown in Table 1 was then added dropwise over 30 minutes in the blend amount shown in the table, and the temperature was then maintained at 110° C. for 2 hours to complete the Michael addition reaction and obtain a liquid diol.

TABLE 1

Diol raw material formulations

| Units: g | Mw | Diol No. 1 | 2 | 3 | 4 | 5 | 6 | 7 |
|---|---|---|---|---|---|---|---|---|
| Diethanolamine | 105.1 | 105.1 | 105.1 | 105.1 | 105.1 | 105.1 | 105.1 | 105.1 |
| (1) Benzyl acrylate | 162.2 | 162.2 | — | — | — | — | — | — |
| (2) Tetrahydrofurfuryl acrylate | 156.2 | — | 156.2 | — | — | — | — | — |
| (3) Acryloylmorpholine | 141.2 | — | — | 141.2 | — | — | — | — |
| (4) Acrylic acid | 72.1 | — | — | — | 72.1 | — | — | — |
| (5) Dimethylacrylamide | 99.1 | — | — | — | — | 99.1 | — | — |
| (6) Diethylacrylamide | 127.2 | — | — | — | — | — | 127.2 | — |
| (7) Dimethylaminopropylacrylamide | 156.2 | — | — | — | — | — | — | 156.2 |
| Total (g) | | 267.3 | 261.3 | 246.3 | 177.2 | 204.2 | 232.3 | 261.3 |

| Units: g | Mw | Diol No. 8 | 9 | 10 | 11 | 12 | 13 | 14 |
|---|---|---|---|---|---|---|---|---|
| Diethanolamine | 105.1 | 105.1 | 105.1 | 105.1 | 105.1 | 105.1 | 105.1 | 105.1 |
| (8) 1H,1H,2H,2H-tridecafluoro acrylate | 418.2 | 418.2 | — | — | — | — | — | — |
| (9) 1H,1H,5H-octafluoropentyl acrylate | 286.1 | — | 286.1 | — | — | — | — | — |
| (10) 2,2,3,3-tetrafluoropropyl acrylate | 186.1 | — | — | 186.1 | — | — | — | — |
| (11) Methoxy polyethylene glycol (PEG9) acrylate | 482.0 | — | — | — | 482.0 | — | — | — |
| (12) Octyl acrylate | 184.3 | — | — | — | — | 184.3 | — | — |
| (13) Acrylonitrile | 53.1 | — | — | — | — | — | 53.1 | — |
| (14) Dimethylaminoethyl acrylate | 143.2 | — | — | — | — | — | — | 143.2 |
| Total (g) | | 523.3 | 391.2 | 291.2 | 587.1 | 289.4 | 158.2 | 248.3 |

The components shown in Table 1 are as described below.
Diethanolamine: $NH(C_2H_4OH)_2$, "DEA" manufactured by Nippon Shokubai Co., Ltd.
Benzyl acrylate: "Viscoat #160" manufactured by Osaka Organic Chemical Industry Ltd.
Tetrahydrofurfuryl acrylate: "Viscoat #150" manufactured by Osaka Organic Chemical Industry Ltd.
Acryloylmorpholine: "ACMO" manufactured by KJ Chemicals Corporation.
Acrylic acid: "AA" manufactured by Nippon Shokubai Co., Ltd.
Dimethylacrylamide: "DMAA" manufactured by KJ Chemicals Corporation.
Diethylacrylamide: "DEAA" manufactured by KJ Chemicals Corporation.

Dimethylaminopropylacrylamide: "DMAPAA" manufactured by KJ Chemicals Corporation.

1H,1H,2H,2H-tridecafluoro acrylate: "Viscoat 13F" manufactured by Osaka Organic Chemical Industry Ltd.

1H,1H,5H-octafluoropentyl acrylate: "Viscoat 8F" manufactured by Osaka Organic Chemical Industry Ltd.

2,2,3,3-tetrafluoropropyl acrylate: "Viscoat 4F" manufactured by Osaka Organic Chemical Industry Ltd.

Methoxy polyethylene glycol (PEGS) acrylate: a comparative monomer, $CH_2=CH-CO-(OCH_2-CH_2)_9-OCH_3$, "AME-400" manufactured by NOF Corporation.

n-octyl acrylate: a comparative monomer, $CH_2=CH-CO-O-C_8H_{17}$, "NOAA" manufactured by Osaka Organic Chemical Industry Ltd.

Acrylonitrile: manufactured by Wako Pure Chemical Industries, Ltd.

Dimethylaminoethyl acrylate: "ARON DA" manufactured by Toagosei Co., Ltd.

<Urethane Compound Synthesis>

Urethane compound raw material formulations are shown in Tables 2, 4 and 6.

A 300 mL four-neck flask was charged with the diol solution obtained above and propylene glycol as another diol component, 0.15 g of dibutyltin dilaurate was added as a tin catalyst, and the temperature was raised to 78° C. with constant stirring under a stream of nitrogen gas. A mixture of the diisocyanate and methyl ethyl ketone (MEK) was then added dropwise to the flask over 30 minutes. Following completion of the dropwise addition, the resulting mixture was reacted under reflux at a temperature of 78° C. to 80° C. for a period of 24 hours, and the reaction mixture was then cooled to obtain a resin solution with a solid fraction of 50.0% by mass. The weight-average molecular weight (Mw, GPC method, referenced against standard polystyrenes) is shown in the corresponding table.

The components shown in the tables are as described below.

Hexamethylene diisocyanate: $OCN-(CH_2)_6-NCO$, manufactured by Wako Pure Chemical Industries, Ltd.

Xylylene diisocyanate: $OCN-CH_2-C_6H_4-CH_2-NCO$, "TAKENATE 500" manufactured by Mitsui Chemicals, Inc.

Propylene glycol: manufactured by Wako Pure Chemical Industries, Ltd.

Tin catalyst: dibutyltin dilaurate, "L-101" manufactured by Tokyo Fine Chemical Co., Ltd.

MEK: methyl ethyl ketone, manufactured by Wako Pure Chemical Industries, Ltd.

<Ink Preparation>

Ink formulations are shown in Tables 3, 5 and 7.

Using the blend amounts shown in each table, the resin solution obtained above, a pigment "MOGUL L", a pigment dispersant "Hypermer KD12", methyl oleate, Exxsol D130 and methyl ethyl ketone "MEK" were mixed, zirconia beads (diameter: 0.5 mm) were added, and a rocking mill (manufactured by Seiwa Giken Co., Ltd.) was used to disperse the mixture for 120 minutes at 67.50 Hz. Following dispersion, the zirconia beads were removed, and an evaporator was used, under both heat and reduced pressure, to remove the low-boiling point solvent (methyl ethyl ketone) from the dispersion. Subsequently, the resulting dispersion was cooled, and then subjected to ultrasound irradiation for 10 minutes under constant stirring using an ultrasonic homogenizer (VC750 manufactured by Sonic & Materials, Inc.). In this manner, the pigment was encapsulated within the urethane compound, yielding an ink containing the encapsulated pigment.

The components shown in the tables are as described below.

Pigment: carbon black, "MOGUL L" manufactured by Cabot Specialty Chemicals, Inc.

Pigment dispersant: comb-shaped amine-based dispersant, "Hypermer KD12" manufactured by Croda Japan Co., Ltd.

Methyl oleate: $CH_3(CH_2)_7CH=CH(CH_2)_7COOCH_3$, manufactured by Tokyo Chemical Industry Co., Ltd.

Petroleum-based hydrocarbon solvent: a naphthene-based solvent, Exxsol D130 manufactured by TonenGeneral Sekiyu K.K.

With the exceptions of the points mentioned below, inks of each of the examples and comparative examples were prepared using the same method as described above.

In Example 18, only methyl oleate was used as the ink solvent.

In Comparative Example 1, a resin solution was not used, and the pigment was not encapsulated within a urethane compound.

In Comparative Examples 2 and 4, resins 20 and 21 having high miscibility with the ink solvent were used for the resin of the resin solution.

In Comparative Example 3, a diol was not used, and a resin 21 was used in which no side chains had been introduced into the urethane compound.

The solubility of the urethane compound used in each example and each comparative example (resins 1 to 22) was determined by measuring the mass (g/100 g) of the urethane compound that dissolved completely in 100 g of the non-aqueous solvent (or the solvent mixture in those cases where two or more non-aqueous solvents were used) that was used in each example and each comparative example.

The results revealed that, in each of the examples, the solubility of the resin in 100 g of the non-aqueous solvent was less than 1 g/100 g. Similarly, in Comparative Example 3, the solubility of the resin 21 in 100 g of the non-aqueous solvent was less than 1 g/100 g.

In Comparative Examples 2 and 4, the solubility of the resins 20 and 22 in 100 g of the non-aqueous solvent exceeded 5 g/100 g. The resins 20 and 22 exhibited miscibility with the non-aqueous solvent.

TABLE 2

| Units: g | Resin formulations | | | | | | | | | |
|---|---|---|---|---|---|---|---|---|---|---|
| | Resin 1 | Resin 2 | Resin 3 | Resin 4 | Resin 5 | Resin 6 | Resin 7 | Resin 8 | Resin 9 | Resin 10 |
| Diol 1 | 53.46 | — | — | — | 26.73 | 26.73 | 26.73 | — | — | — |
| Diol 2 | — | 52.26 | — | — | 26.13 | — | — | — | — | — |
| Diol 3 | — | — | 49.26 | — | — | 24.63 | — | — | — | — |
| Diol 4 | — | — | — | 35.44 | — | — | 17.72 | — | — | — |
| Diol 5 | — | — | — | — | — | — | — | 40.84 | — | — |
| Diol 6 | — | — | — | — | — | — | — | — | 46.46 | — |
| Diol 7 | — | — | — | — | — | — | — | — | — | 52.26 |

TABLE 2-continued

Resin formulations

| Units: g | Resin 1 | Resin 2 | Resin 3 | Resin 4 | Resin 5 | Resin 6 | Resin 7 | Resin 8 | Resin 9 | Resin 10 |
|---|---|---|---|---|---|---|---|---|---|---|
| Hexamethylene diisocyanate | 67.28 | 67.28 | 67.28 | 67.28 | 50.46 | 50.46 | 50.46 | 67.28 | 67.28 | 67.28 |
| Propylene glycol | 15.20 | 15.20 | 15.20 | 15.20 | 7.60 | 7.60 | 7.60 | 15.2 | 15.2 | 15.2 |
| Tin catalyst | 0.15 | 0.15 | 0.15 | 0.15 | 0.15 | 0.15 | 0.15 | 0.15 | 0.15 | 0.15 |
| MEK | 136.09 | 134.89 | 131.89 | 118.07 | 111.07 | 109.57 | 102.66 | 123.47 | 129.09 | 134.89 |
| Total (g) | 272.18 | 269.78 | 263.78 | 236.14 | 222.14 | 219.14 | 205.32 | 246.94 | 258.18 | 269.78 |
| Weight-average molecular weight | 9500 | 9200 | 9000 | 11000 | 10000 | 9900 | 8900 | 11000 | 9000 | 8500 |

TABLE 3

Ink formulations and evaluation results

| | Example | | | | | | | | | |
|---|---|---|---|---|---|---|---|---|---|---|
| Units: % by mass | 1 | 2 | 3 | 4 | 5 | 6 | 7 | 8 | 9 | 10 |
| Pigment | 10.00 | 10.00 | 10.00 | 10.00 | 10.00 | 10.00 | 10.00 | 10.00 | 10.00 | 10.00 |
| Resin No. | 1 | 2 | 3 | 4 | 5 | 6 | 7 | 8 | 9 | 10 |
| Resin amount (50% solid fraction) (solid fraction amount) | 5.00 (2.50) | 5.00 (2.50) | 5.00 (2.50) | 5.00 (2.50) | 5.00 (2.50) | 5.00 (2.50) | 5.00 (2.50) | 5.00 (2.50) | 5.00 (2.50) | 5.00 (2.50) |
| Pigment dispersant | 5.00 | 5.00 | 5.00 | 5.00 | 5.00 | 5.00 | 5.00 | 5.00 | 5.00 | 5.00 |
| Methyl oleate | 41.25 | 41.25 | 41.25 | 41.25 | 41.25 | 41.25 | 41.25 | 41.25 | 41.25 | 41.25 |
| Petroleum-based hydrocarbon solvent | 41.25 | 41.25 | 41.25 | 41.25 | 41.25 | 41.25 | 41.25 | 41.25 | 41.25 | 41.25 |
| Total (% by mass)* | 100.00 | 100.00 | 100.00 | 100.00 | 100.00 | 100.00 | 100.00 | 100.00 | 100.00 | 100.00 |
| Nozzle plate wetting properties | A | A | A | AA | AA | AA | AA | A | A | AA |
| Wiping resistance | A | A | A | AA | AA | AA | AA | AA | AA | AA |
| Image density (surface OD) | A | A | AA | AA | AA | AA | AA | AA | AA | AA |
| Image show-through (rear surface OD) | A | A | AA | AA | A | AA | AA | AA | AA | AA |
| Abrasion resistance (coated paper) | B | B | B | B | B | B | B | B | B | B |
| Fixation (glass surface) | B | B | B | B | B | B | B | B | B | B |
| Ink storage stability (70° C., 1 month) | A | A | A | A | A | A | A | A | A | A |

*The total indicates the amount following removal of the methyl ethyl ketone from the resin.

TABLE 4

Resin formulations

| Units: g | Resin 11 | Resin 12 | Resin 13 | Resin 14 | Resin 15 | Resin 16 | Resin 17 | Resin 18 | Resin 19 |
|---|---|---|---|---|---|---|---|---|---|
| Diol 1 | 26.73 | 26.73 | 26.73 | — | — | — | — | — | — |
| Diol 2 | — | — | — | — | — | — | — | — | — |
| Diol 3 | — | — | — | — | — | — | 49.26 | — | — |
| Diol 4 | — | — | — | — | — | — | — | — | — |
| Diol 5 | 20.42 | — | — | — | — | — | — | — | — |
| Diol 6 | — | 23.23 | — | — | — | — | — | — | — |
| Diol 7 | — | — | 26.13 | — | — | — | — | — | — |
| Diol 8 | — | — | — | 52.33 | — | — | — | — | — |
| Diol 9 | — | — | — | — | 39.12 | — | — | — | — |
| Diol 10 | — | — | — | — | — | 29.12 | — | — | — |
| Diol 13 | — | — | — | — | — | — | — | 31.64 | — |
| Diol 14 | — | — | — | — | — | — | — | — | 49.66 |
| Hexamethylene diisocyanate | 50.46 | 50.46 | 50.46 | 67.28 | 67.28 | 67.28 | — | 67.28 | 67.28 |
| Xylylene diisocyanate | — | — | — | — | — | — | 75.27 | — | — |
| Propylene glycol | 7.6 | 7.6 | 7.6 | 15.2 | 15.2 | 15.2 | 15.20 | 15.20 | 15.20 |

TABLE 4-continued

Resin formulations

| Units: g | Resin 11 | Resin 12 | Resin 13 | Resin 14 | Resin 15 | Resin 16 | Resin 17 | Resin 18 | Resin 19 |
|---|---|---|---|---|---|---|---|---|---|
| Catalyst | 0.15 | 0.15 | 0.15 | 0.15 | 0.15 | 0.15 | 0.15 | 0.15 | 0.15 |
| MEK | 105.36 | 108.17 | 111.07 | 134.96 | 121.75 | 111.75 | 139.88 | 114.27 | 132.29 |
| Total (g) | 210.72 | 216.34 | 222.14 | 269.92 | 243.50 | 223.50 | 279.76 | 228.54 | 264.58 |
| Weight-average molecular weight | 11000 | 8000 | 7500 | 12000 | 9800 | 9000 | 9500 | 8800 | 10000 |

TABLE 5

Ink formulations and evaluation results

| | Example | | | | | | | | | |
|---|---|---|---|---|---|---|---|---|---|---|
| Units: % by mass | 11 | 12 | 13 | 14 | 15 | 16 | 17 | 18 | 19 | 20 |
| Pigment | 10.00 | 10.00 | 10.00 | 10.00 | 10.00 | 10.00 | 10.00 | 10.00 | 10.00 | 10.00 |
| Resin No. | 11 | 12 | 13 | 14 | 15 | 16 | 17 | 3 | 18 | 19 |
| Resin amount (50% solid fraction) (solid fraction amount) | 5.00 (2.50) | 5.00 (2.50) | 5.00 (2.50) | 5.00 (2.50) | 5.00 (2.50) | 5.00 (2.50) | 5.00 (2.50) | 5.00 (2.50) | 5.00 (2.50) | 5.00 (2.50) |
| Pigment dispersant | 5.00 | 5.00 | 5.00 | 5.00 | 5.00 | 5.00 | 5.00 | 5.00 | 5.00 | 5.00 |
| Methyl oleate | 41.25 | 41.25 | 41.25 | 41.25 | 41.25 | 41.25 | 41.25 | 82.50 | 41.25 | 41.25 |
| Petroleum-based hydrocarbon solvent | 41.25 | 41.25 | 41.25 | 41.25 | 41.25 | 41.25 | 41.25 | | 41.25 | 41.25 |
| Total (% by mass)* | 100.00 | 100.00 | 100.00 | 100.00 | 100.00 | 100.00 | 100.00 | 100.00 | 100.00 | 100.00 |
| Nozzle plate wetting properties | AA | AA | AA | A | A | A | A | A | A | A |
| Wiping resistance | AA | AA | AA | AA | AA | AA | A | A | AA | AA |
| Image density (surface OD) | AA | AA | AA | A | AA | AA | AA | AA | AA | AA |
| Image show-through (rear surface OD) | AA | AA | AA | A | AA | AA | AA | A | AA | AA |
| Abrasion resistance (coated paper) | B | B | B | A | A | A | B | B | B | B |
| Fixation (glass surface) | B | B | B | A | A | A | B | B | B | B |
| Ink storage stability (70° C., 1 month) | A | A | A | A⁻ | A⁻ | A⁻ | A | A | A | A |

*The total indicates the amount following removal of the methyl ethyl ketone from the resin.

TABLE 6

Resin formulations

| Units: g | Resin 20 | Resin 21* | Resin 22 |
|---|---|---|---|
| Diol 11 | 58.71 | — | — |
| Diol 12 | — | — | 28.94 |
| Hexamethylene diisocyanate | 33.64 | 84.10 | 67.28 |
| Propylene glycol | 7.60 | 38.00 | 15.2 |
| Tin catalyst | 0.15 | 0.15 | 0.15 |
| MEK | 100.10 | 122.15 | 111.57 |
| Total (g) | 200.20 | 244.40 | 223.14 |
| Weight-average molecular weight | 8900 | 9500 | 9200 |

*Resin 21 has no diol.

TABLE 7

Ink formulations and evaluation results

| Units: % by mass | Comparative Example 1 | Comparative Example 2 | Comparative Example 3 | Comparative Example 4 |
|---|---|---|---|---|
| Pigment | 10.00 | 10.00 | 10.00 | 10.00 |
| Resin No. | — | 20 | 21 | 22 |
| Resin amount (50% solid fraction) (solid fraction amount) | — | 5.00 (2.50) | 5.00 (2.50) | 5.00 (2.50) |
| Pigment dispersant | 5.00 | 5.00 | 5.00 | 5.00 |
| Methyl oleate | 42.50 | 41.25 | 41.25 | 41.25 |
| Petroleum-based hydrocarbon solvent | 42.50 | 41.25 | 41.25 | 41.25 |
| Total (% by mass)* | 100.00 | 100.00 | 100.00 | 100.00 |

TABLE 7-continued

Ink formulations and evaluation results

| Units: % by mass | Comparative Example 1 | Comparative Example 2 | Comparative Example 3 | Comparative Example 4 |
|---|---|---|---|---|
| Nozzle plate wetting properties | C | AA | C | A |
| Wiping resistance | C | AA | C | A |
| Image density (surface OD) | C | B | B | B |
| Image show-through (rear surface OD) | C | B | C | B |
| Abrasion resistance (coated paper) | C | B | B | B |
| Fixation (glass surface) | C | B | B | B |
| Ink storage stability (70° C., 1 month) | A | A | C | A |

*The total indicates the amount following removal of the methyl ethyl ketone from the resin.

<Evaluations>

The inks of the above examples and comparative examples were evaluated using the methods described below. The results of these evaluations are shown in Table 3, Table 5 and Table 7.

(1) Nozzle Plate Wetting Properties

A 30 ml sample of each ink was placed in a glass container, one edge of a nozzle plate used in an inkjet printer "Orphis EX9050" (a product name, manufactured by Riso Kagaku Corporation) was grasped with a set of tweezers, and the opposite edge of the nozzle plate was immersed in the ink to a depth of 2 cm for 5 seconds. Subsequently, the nozzle plate was pulled rapidly out of the ink, and the time t taken for the residual ink film on the nozzle plate to form ink droplets was measured. The same operation was repeated 10 times using the same nozzle plate, and the value of t was measured for each repetition. The average of the 10 t values was calculated and recorded as the ink repellency time, which was then evaluated against the following criteria.

AA: ink repellency time of less than 1 second.

A: ink repellency time of at least 1 second but less than 3 seconds

B: ink repellency time of at least 3 seconds but less than 4 seconds

C: ink repellency time of 4 seconds or longer (2) Wiping Resistance

Using an inkjet printer "Orphis EX9050" (a product name, manufactured by Riso Kagaku Corporation), head cleaning was performed 1,000 times using the normal cleaning operation for head maintenance. After completing the 1,000 head cleaning operations, the ink repellency of the portion of the nozzle plate contacted by the wiping blade was evaluated visually.

AA: ink repellency maintained for entire portion contacted by wiping blade. Following testing, ink is completely repelled immediately.

A: ink repellency maintained for entire portion contacted by wiping blade. Following testing, several seconds required for complete ink repulsion.

B: ink repellency deteriorates for some of the portion contacted by wiping blade.

C: ink repellency deteriorates for all of the portion contacted by wiping blade.

(3) Image Density and Image Show-Through

Using the inkjet head installed in the inkjet printer "Orphis EX9050", a solid image was printed onto a plain paper (Riso Paper Multi, manufactured by Riso Kagaku Corporation) at a resolution of 600 dpi×600 dpi and using a volume of 12 pl per pixel. One day after printing, an optical densitometer (RD920, manufactured by Macbeth Corporation) was used to measure the OD value of the printed surface of the printed item (surface OD) and the rear surface of the printed item (rear surface OD). The image density was evaluated from the surface OD value using the criteria below. The image show-through was evaluated from the rear surface OD value using the criteria below.

(Image Density)

AA: OD value of 1.15 or greater

A: OD value of at least 1.10 but less than 1.15

B: OD value of at least 1.00 but less than 1.10

C: OD value of less than 1.00

(Image Show-Through)

AA: OD value of less than 0.10

A: OD value of at least 0.10 but less than 0.20

B: OD value of at least 0.20 but less than 0.30

C: OD value of 0.30 or greater (4) Abrasion Resistance (Coated Paper)

Each ink was loaded into a line-type inkjet printer "Orphis EX9050" (manufactured by Riso Kagaku Corporation), and a solid image was printed onto a high-quality paper "Aurora Coated Paper" (manufactured by Nippon Paper Industries Co., Ltd.) to obtain a printed item. Printing was performed under discharge conditions including a resolution of 300 dpi×300 dpi and an ink volume of 42 pl per dot. The "Orphis EX9050" uses a line-type inkjet head, and is a system in which printing is performed while transporting the paper in a sub-scanning direction orthogonal to the main scanning direction (the direction along which the nozzles are aligned).

After standing for 24 hours following printing, the solid printed portion of the printed item was rubbed 5 times strongly with a finger, the state of the printed item was then inspected visually, and the abrasion resistance was evaluated against the following criteria.

A: separation of the image almost undetectable

B: slight separation of the image is noticeable, but not problematic in terms of actual use.

C: marked separation of the image, problematic in terms of actual use.

(5) Fixation (Glass Surface)

Each ink was applied uniformly to a glass slide "White Crown Glass, Ground Edges No. 1" (manufactured by Matsunami Glass Ind., Ltd.) using a wire bar #4, the glass slide was placed in a thermostatic oven set to 100° C. and dried for 3 minutes, and following subsequent standing for 5 minutes at room temperature, the fixation of the ink film to the glass surface was evaluated by performing a dry-to-touch test.

The portion to which the ink had been applied was touched with a finger and then inspected visually, and the fixation to the glass surface was evaluated against the following criteria. Tack is an indicator of the degree of stickiness of the ink.

A: no tack, with no ink adhered to the finger

B: no ink adheres to the finger, but some tack

C: ink adheres to the finger (6) Storage Stability (70° C., 1 Month)

First, the ink viscosity was measured immediately after ink preparation.

Subsequently, 10 ml of the ink was placed in a screw-top vial, and left to stand at 70° C. for one month. The ink was then sampled, and another ink viscosity measurement was performed.

The viscosity was measured using a rheometer ARG2 (manufactured by TA Instruments, Inc.), under conditions including a cone angle of 2°, a diameter of 40 mm and room temperature (23° C.).

Based on the ink viscosity after standing for one month, the change in viscosity was determined using the following formula, and the storage stability was evaluated against the following criteria.

Change in viscosity (%)=100−(ink viscosity after standing (mPa·s)/ink viscosity immediately after preparation (mPa·s))×100

A: change in viscosity within ±5%
A⁻: change in viscosity within ±7%
B: change in viscosity of less than ±10%
C: change in viscosity of ±10% or greater As shown in each of the tables, the inks of each of the examples exhibited good results for the nozzle plate wetting properties and the wiping resistance, and were also able to suppress image show-through in the printed item, meaning a high image density was able to be obtained.

Examples 1 to 4 are inks in which the encapsulated pigments were prepared using urethane compounds having various side chains prepared using various diols, and good results were obtained. As the polarity of the diol increased, solvent separation was promoted, show-through was reduced, and the nozzle plate wetting properties were also improved.

Examples 5 to 7 are inks in which the encapsulated pigments were prepared using urethane compounds having benzyl groups and various side chains, and the nozzle plate wetting properties and the wiping resistance were further improved, image show-through was reduced, and the image density was high.

Examples 8 to 10, 19 and 20 are inks in which the encapsulated pigments were prepared using urethane compounds having nitrogen-containing groups, and good results were obtained. It was evident that by incorporating nitrogen-containing groups in the urethane compound, the wiping resistance was further improved, image show-through was reduced, and the image density tended to increase.

Examples 11 to 13 are inks in which the encapsulated pigments were prepared using urethane compounds having benzyl groups and nitrogen-containing groups, and good results were obtained. In Examples 11 and 12, the nozzle plate wetting properties were particularly improved.

Examples 14 to 16 are inks in which the encapsulated pigments were prepared using urethane compounds containing fluoroalkyl groups, and good results were obtained. In Examples 14 to 16, additional functionality was able to be imparted to the inks, with improved abrasion resistance on coated paper and improved fixation to glass surfaces.

Example 17 is a modification of Example 3 in which the encapsulated pigment was prepared using a urethane compound having a different urethane skeleton, and good results were obtained.

Example 18 is a modification of Example 3 in which the non-aqueous solvent for the ink was different, and good results were obtained.

Comparative Example 1 is an ink which did not contain a urethane compound, meaning the pigment was not encapsulated, and satisfactory results could not be achieved.

Comparative Example 2 is an ink in which the encapsulated pigment was prepared using a urethane compound having a methoxy polyethylene glycol chain, and because the urethane compound exhibited miscibility with the non-aqueous solvent, the results for the image show-through and image density of the printed item were unsatisfactory.

Comparative Example 3 is an ink in which the pigment was encapsulated within a urethane compound containing no side chains, and satisfactory results could not be obtained. In Comparative Example 3, the nozzle plate wetting properties and the wiping resistance were particularly inferior.

Comparative Example 4 is an ink in which the encapsulated pigment was prepared using a urethane compound having octyl chains, and because the urethane compound exhibited miscibility with the non-aqueous solvent, the results for the image show-through and image density of the printed item were unsatisfactory.

Production Example B

Examples B1 to B12 and Comparative Example B1 are described below as examples of the Production Example B. Components for which no particular description is provided used the same components as described above for Production Example A.

<Diol Synthesis>

Diol raw material formulations are shown in Table 8.

A 300 mL four-neck flask was charged with 105.1 g of diethanolamine (molecular weight (Mw): 105.1), and the temperature was raised to 110° C. with constant stirring under a stream of nitrogen gas. For each diol, the monomer shown in Table 8 was then added dropwise over 30 minutes in the blend amount shown in the table, and the temperature was then maintained at 110° C. for 2 hours to complete the reaction and obtain a liquid diol.

TABLE 8

Diol raw material formulations

| | | Diol No. | | | | | |
|---|---|---|---|---|---|---|---|
| Units: g | Mw | B1 | B2 | B3 | B4 | B5 | B6 |
| Diethanolamine | 105.1 | 105.1 | 105.1 | 105.1 | 105.1 | 105.1 | 105.1 |
| (1) Benzyl acrylate | 162.2 | 162.2 | — | — | — | — | — |
| (2) Acryloylmorpholine | 141.2 | — | 141.2 | — | — | — | — |
| (3) Dimethylacrylamide | 99.1 | — | — | 99.1 | — | — | — |
| (4) 3-Acryloxypropyltrimethoxysilane | 234.3 | — | — | — | 234.3 | — | — |
| (5) 3-glycidoxypropyltrimethoxysilane | 236.3 | — | — | — | — | 236.3 | — |

TABLE 8-continued

Diol raw material formulations

| Units: g | Mw | Diol No. | | | | | |
| --- | --- | --- | --- | --- | --- | --- | --- |
| | | B1 | B2 | B3 | B4 | B5 | B6 |
| (6) Methoxy polyethylene glycol (PEG9) acrylate | 482.0 | — | — | — | — | — | 482.0 |
| Total (g) | | 267.3 | 246.3 | 204.2 | 339.4 | 341.4 | 587.1 |

The components shown in Table 8 are as described below.

Diethanolamine: $NH(C_2H_4OH)_2$, "DEA" manufactured by Nippon Shokubai Co., Ltd.

Benzyl acrylate: "Viscoat #160" manufactured by Osaka Organic Chemical Industry Ltd.

Acryloylmorpholine: "ACMO" manufactured by KJ Chemicals Corporation.

Dimethylacrylamide: "DMAA" manufactured by KJ Chemicals Corporation.

3-acryloxypropyltrimethoxysilane: "KBM-5103" manufactured by Shin-Etsu Chemical Co., Ltd.

3-glycidoxypropyltrimethoxysilane: "KBM-403" manufactured by Shin-Etsu Chemical Co., Ltd.

Methoxy polyethylene glycol (PEG8) acrylate: a comparative monomer, $CH_2=CH-CO-(OCH_2-CH_2)_9-OCH_3$, "AME-400" manufactured by NOF Corporation.

<Urethane Compound Synthesis>

Raw material formulations of resins B1 to B6 used as urethane compounds are shown in Table 9.

A 300 mL four-neck flask was charged with the diol solution B4 obtained above, the diol solutions B1 to B3 and propylene glycol as another diol component in accordance with the formulation shown in the table, 0.15 g of dibutyltin dilaurate was added as a tin catalyst, and the temperature was raised to 78° C. with constant stirring under a stream of nitrogen gas. A mixture of the divalent isocyanate and methyl ethyl ketone (MEK) was then added dropwise to the flask over 30 minutes. Following completion of the dropwise addition, the resulting mixture was reacted under reflux at a temperature of 78° C. to 80° C. for a period of 24 hours, and the reaction mixture was then cooled to obtain a resin solution with a solid fraction of 50.0% by mass. The weight-average molecular weight (Mw, GPC method, referenced against standard polystyrenes) is shown in the corresponding table.

Raw material formulations of resins B7 to B13 used as urethane compounds are shown in Table 11.

In the case of the resins B7 to B9, with the exception of charging the 300 mL four-neck flask with 3-mercaptopropyltrimethoxysilane, the diol solutions B1 to B3 obtained above and propylene glycol as another diol component in accordance with the formulation shown in the table, the same procedure as that described above for the resin B1 was used to obtain a resin solution with a solid fraction of 50.0% by mass.

In the case of the resin B10, with the exception of replacing the diol solution B4 with the diol solution B5 in accordance with the formulation shown in the table, the same procedure as that described above for the resin B1 was used to obtain a resin solution with a solid fraction of 50.0% by mass.

In the case of the resin B11, with the exception of charging the 300 mL four-neck flask with 3-isocyanatopropyltriethoxysilane, the diol solutions B1 to B3 obtained above and propylene glycol as another diol component in accordance with the formulation shown in the table, the same procedure as that described above for the resin B1 was used to obtain a resin solution with a solid fraction of 50.0% by mass.

In the case of the resin B12, with the exception of charging the 300 mL four-neck flask with the diol solutions B1 to B3 obtained above and propylene glycol as another diol component in accordance with the formulation shown in the table, the same procedure as that described above for the resin B1 was used to obtain a resin solution with a solid fraction of 50.0% by mass.

In the case of the resin B13, with the exception of charging the 300 mL four-neck flask with the diol solution B6 obtained above and propylene glycol as another diol component in accordance with the formulation shown in the table, the same procedure as that described above for the resin B1 was used to obtain a resin solution with a solid fraction of 50.0% by mass.

The components shown in each of the tables are as described below.

3-mercaptopropyltrimethoxysilane (Mw 196.4): "KBM-803" manufactured by Shin-Etsu Chemical Co., Ltd.

3-isocyanatopropyltriethoxysilane (Mw 274.4): "KBE-9007" manufactured by Shin-Etsu Chemical Co., Ltd.

Hexamethylene diisocyanate: $OCN-(CH_2)_6-NCO$, Mw 168.2, manufactured by Wako Pure Chemical Industries, Ltd.

Xylylene diisocyanate: $OCN-CH_2-C_6H_4-CH_2-NCO$, Mw 188.18, "TAKENATE 500" manufactured by Mitsui Chemicals, Inc.

Propylene glycol: Mw 76.1, manufactured by Wako Pure Chemical Industries, Ltd.

Tin catalyst: dibutyltin dilaurate, "L-101" manufactured by Tokyo Fine Chemical Co., Ltd.

MEK: methyl ethyl ketone, manufactured by Wako Pure Chemical Industries, Ltd.

<Ink Preparation>

Ink formulations are shown in Tables 10 and 12.

Using the blend amounts shown in each table, the resin solutions obtained above, a pigment "MOGUL L", a pigment dispersant "Hypermer KD11", methyl oleate, Exxsol D130 and methyl ethyl ketone "MEK" were mixed, zirconia beads (diameter: 0.5 mm) were added, and a rocking mill (manufactured by Seiwa Giken Co., Ltd.) was used to disperse the mixture for 120 minutes at 67.50 Hz. Following dispersion, the zirconia beads were removed, and an evaporator was used, under both heat and reduced pressure, to remove the low-boiling point solvent (methyl ethyl ketone) from the dispersion. Subsequently, the resulting dispersion was cooled, and then subjected to ultrasound irradiation for 10 minutes under constant stirring using an ultrasonic homogenizer (VC750 manufactured by Sonic & Materials, Inc.). In this manner, the pigment was encapsulated within the urethane compound, yielding an ink containing the encapsulated pigment.

The components shown in the tables are as described below.

MOGUL L: a carbon black "MOGUL L", manufactured by Cabot Specialty Chemicals, Inc.

Raven 1035: "Raven 1035" manufactured by Aditya Birla Group

Hypermer KD11: "Hypermer KD11" manufactured by Croda Japan Co., Ltd.

Solsperse 28000: "Solsperse 28000" manufactured by The Lubrizol Corporation

Methyl oleate: $CH_3(CH_2)_7CH=CH(CH_2)_7COOCH_3$, manufactured by Tokyo Chemical Industry Co., Ltd.

Isopropyl myristate: "IPM-R" manufactured by Kokyu Alcohol Kogyo Co., Ltd.

Petroleum-based hydrocarbon solvent: a naphthene-based solvent, Exxsol D130 manufactured by TonenGeneral Sekiyu K.K.

Oleyl alcohol: "Oleyl Alcohol VP" manufactured by Kokyu Alcohol Kogyo Co., Ltd.

With the exceptions of the points described below, the inks of the examples and comparative examples were prepared in accordance with the method described above.

In Example B11 and Example B12, the solvent and the dispersant were altered when preparing the ink.

In Example B13, the diol B1 and the diol B3 were used, and a resin B12 containing no alkoxysilyl groups was used in preparing the ink.

In Comparative Example B1, the diol B6 was prepared using a comparative monomer, and a resin B13 containing no alkoxysilyl groups was used in preparing the ink.

The solubility of the urethane compound used in each example and each comparative example (resins B1 to B13) was determined by measuring the mass (g/100 g) of the urethane compound that dissolved completely in 100 g of the non-aqueous solvent (or the solvent mixture in those cases where two or more non-aqueous solvents were used) that was used in each example and each comparative example.

The results revealed that, in each of the examples, the solubility of the resin in 100 g of the non-aqueous solvent was less than 1 g/100 g.

In Comparative Example B1, the solubility of the resin B13 in 100 g of the non-aqueous solvent exceeded 5 g/100 g. The resin B13 exhibited miscibility with the non-aqueous solvent.

TABLE 9

Resin formulations

| | Units: g | Resin B1 | Resin B2 | Resin B3 | Resin B4 | Resin B5 | Resin B6 |
|---|---|---|---|---|---|---|---|
| Alkoxysilyl group-containing compound | 3-mercaptopropyl-trimethoxysilane | — | — | — | — | — | — |
| | Diol B5 | — | — | — | — | — | — |
| | 3-isocyanatopropyl-triethoxysilane | — | — | — | — | — | — |
| | Diol B4 | 3.39 | 3.39 | 3.39 | 3.39 | 0.34 | 16.97 |
| Diol | Diol B1 | — | — | 26.73 | 26.73 | 26.73 | 26.73 |
| | Diol B2 | 49.26 | — | 24.63 | — | — | — |
| | Diol B3 | — | 40.84 | — | 20.41 | 20.41 | 20.41 |
| | Diol B6 | — | — | — | — | — | — |
| Divalent isocyanate | Hexamethylene diisocyanate | 68.96 | 68.96 | 68.96 | 68.96 | 67.45 | 75.69 |
| | Xylylene diisocyanate | — | — | — | — | — | — |
| | Propylene glycol | 15.22 | 15.22 | 15.22 | 15.22 | 15.22 | 15.22 |
| | Tin catalyst | 0.15 | 0.15 | 0.15 | 0.15 | 0.15 | 0.15 |
| | Aprotic solvent: MEK | 136.98 | 128.56 | 139.08 | 134.86 | 130.30 | 155.17 |
| | Total (g) | 273.96 | 257.12 | 278.16 | 269.72 | 260.60 | 310.34 |
| | Weight-average molecular weight (Mw) | 16700 | 16300 | 16400 | 16900 | 15700 | 28700 |

TABLE 10

Ink formulations and evaluation results

| | Units: % by mass | Example B1 | Example B2 | Example B3 | Example B4 | Example B5 | Example B6 |
|---|---|---|---|---|---|---|---|
| Pigment | MOGUL L | 10.00 | 10.00 | 10.00 | 10.00 | 10.00 | 10.00 |
| | Raven 1035 | — | — | — | — | — | — |
| Resin | Resin No. | B1 | B2 | B3 | B4 | B5 | B6 |
| | Resin amount (50% solid fraction) (solid fraction amount) | 5.00 (2.50) | 5.00 (2.50) | 5.00 (2.50) | 5.00 (2.50) | 5.00 (2.50) | 5.00 (2.50) |
| Dispersant | Hypermer KD11 | 5.00 | 5.00 | 5.00 | 5.00 | 5.00 | 5.00 |
| | Solsperse 28000 | — | — | — | — | — | — |
| Ester-based solvent | Methyl oleate | 41.25 | 41.25 | 41.25 | 41.25 | 41.25 | 41.25 |
| | Isopropyl myristate | — | — | — | — | — | — |

TABLE 10-continued

Ink formulations and evaluation results

| Units: % by mass | | Example B1 | Example B2 | Example B3 | Example B4 | Example B5 | Example B6 |
|---|---|---|---|---|---|---|---|
| Petroleum-based solvent | Petroleum-based hydrocarbon solvent | 41.25 | 41.25 | 41.25 | 41.25 | 41.25 | 41.25 |
| Alcohol-based solvent | Oleyl alcohol | — | — | — | — | — | — |
| | Total (% by mass) | 100.00 | 100.00 | 100.00 | 100.00 | 100.00 | 100.00 |
| | Pigment concentration after MEK removal (% by mass) | 10.00 | 10.00 | 10.00 | 10.00 | 10.00 | 10.00 |
| | Nozzle plate wetting properties | A | A | AA | AA | AA | AA |
| | Wiping resistance | A | AA | AA | AA | AA | A |
| | Image density (surface OD) | AA | AA | AA | AA | AA | A |
| | Image show-through (rear surface OD) | AA | AA | AA | AA | AA | AA |
| | Abrasion resistance (coated paper) | A | A | A | A | A | A |
| | Fixation (glass surface) | A | A | A | A | A | A |
| | Ink storage stability (70° C., 1 month) | A | A | A | A | A | A |

TABLE 11

Resin formulations

| Units: g | | Resin B7 | Resin B8 | Resin B9 | Resin B10 | Resin B11 | Resin B12 | Resin B13 |
|---|---|---|---|---|---|---|---|---|
| Alkoxysilyl group-containing compound | 3-mercaptopropyl-trimethoxysilane | 1.96 | 1.96 | 1.96 | — | — | — | — |
| | Diol B5 | — | — | — | 3.41 | — | — | — |
| | 3-isocyanatopropyl-triethoxysilane | — | — | — | — | 2.74 | — | — |
| | Diol B4 | — | — | — | — | — | — | — |
| Diol | Diol B1 | 26.73 | 26.73 | 26.73 | 26.73 | 26.73 | 26.73 | — |
| | Diol B2 | 24.63 | — | — | 24.63 | — | — | — |
| | Diol B3 | — | 20.41 | 20.41 | — | 20.41 | 20.41 | — |
| | Diol B6 | — | — | — | — | — | — | 58.71 |
| Divalent isocyanate | Hexamethylene diisocyanate | 68.12 | 68.12 | — | 68.12 | 68.12 | 67.28 | 33.64 |
| | Xylylene diisocyanate | — | — | 76.21 | — | — | — | — |
| | Propylene glycol | 15.22 | 15.22 | 15.22 | 15.22 | 15.22 | 15.22 | 7.60 |
| | Tin catalyst | 0.15 | 0.15 | 0.15 | 0.15 | 0.15 | 0.15 | 0.15 |
| | Aprotic solvent: MEK | 136.81 | 132.59 | 140.68 | 136.81 | 132.59 | 129.79 | 100.10 |
| | Total (g) | 273.62 | 265.18 | 281.36 | 275.07 | 265.96 | 259.58 | 200.20 |
| | Weight-average molecular weight (Mw) | 18400 | 16800 | 17200 | 17400 | 18000 | 14000 | 17800 |

TABLE 12

Ink formulations and evaluation results

| Units: % by mass | | Example B7 | Example B8 | Example B9 | Example B10 | Example B11 | Example B12 | Example B13 | Comparative Example B1 |
|---|---|---|---|---|---|---|---|---|---|
| Pigment | MOGUL L | 10.00 | 10.00 | 10.00 | 10.00 | 10.00 | — | 10.00 | 10.00 |
| | Raven 1035 | — | — | — | — | — | 10.00 | — | — |
| Resin | Resin No. | B7 | B8 | B10 | B11 | B1 | B9 | B12 | B13 |
| | Resin amount | 5.00 | 5.00 | 5.00 | 5.00 | 5.00 | 5.00 | 5.00 | 5.00 |
| | (50% solid fraction) (solid fraction amount) | (2.50) | (2.50) | (2.50) | (2.50) | (2.50) | (2.50) | (2.50) | (2.50) |
| Dispersant | Hypermer KD11 | 5.00 | 5.00 | 5.00 | 5.00 | 5.00 | — | 5.00 | 5.00 |
| | Solsperse 28000 | — | — | — | — | — | 2.50 | — | — |
| Ester-based solvent | Methyl oleate | 41.25 | 41.25 | 41.25 | 41.25 | — | — | 41.25 | 41.25 |
| | Isopropyl myristate | — | — | — | — | — | 85.00 | — | — |
| Petroleum-based solvent | Petroleum-based hydrocarbon solvent | 41.25 | 41.25 | 41.25 | 41.25 | 80.00 | — | 41.25 | 41.25 |
| Alcohol-based solvent | Oleyl alcohol | — | — | — | — | 5.00 | — | — | — |
| | Total (% by mass) | 100.00 | 100.00 | 100.00 | 100.00 | 100.00 | 100.00 | 100.00 | 100.00 |
| | Pigment concentration after MEK removal (% by mass) | 10.00 | 10.00 | 10.00 | 10.00 | 10.00 | 10.00 | 10.00 | 10.00 |
| | Nozzle plate wetting properties | AA | AA | AA | AA | A | AA | AA | AA |

TABLE 12-continued

Ink formulations and evaluation results

| Units: % by mass | Example B7 | Example B8 | Example B9 | Example B10 | Example B11 | Example B12 | Example B13 | Comparative Example B1 |
|---|---|---|---|---|---|---|---|---|
| Wiping resistance | AA | AA | AA | AA | A | AA | AA | AA |
| Image density (surface OD) | AA | AA | AA | AA | AA | AA | AA | B |
| Image show-through (rear surface OD) | AA | AA | AA | AA | AA | AA | AA | B |
| Abrasion resistance (coated paper) | A | A | A | A | A | A | B | B |
| Fixation (glass surface) | A | A | A | A | A | A | B | B |
| Ink storage stability (70° C., 1 month) | A | A | A | A | A | A | A | A |

<Evaluations>

The inks of the above examples and comparative examples were evaluated using the same methods as those described above for Production Example A. The results of these evaluations are shown in Table 10 and Table 12.

As shown in each of the tables, the inks of each of the examples exhibited good results for the nozzle plate wetting properties and the wiping resistance, and were also able to suppress image show-through in the printed item, meaning a high image density was able to be obtained.

It was evident that in each of the examples, the abrasion resistance and the fixability improved compared with the case of the resin B12 in which a urethane compound containing no alkoxysilyl groups was used.

Examples B1 to B6 are inks in which the diol B4 derived from 3-acryloxypropyltrimethoxysilane was used together with the diols B1 to B3 to prepare urethane compounds having various types of side chains, and encapsulated pigments were then prepared using these urethane compounds, and in each case, good results were obtained.

As the polarity of the diols increased, solvent separability was promoted, resulting in a reduction in show-through and an improvement in the nozzle plate wetting properties.

Examples B3 to B6 are inks in which urethane compounds having side chains containing a propyltrimethoxysilyl group and various side chains containing a benzyl group were used to prepare encapsulated pigments, and in each case, the nozzle plate wetting properties were able to be improved.

Examples B7 and B8 are inks in which urethane compounds having units derived from 3-mercaptopropyltrimethoxysilane introduced at the isocyanate groups of the urethane compound, and also having various side chains containing benzyl groups were used to prepare encapsulated pigments, and good results were obtained.

Example B9 is a modification of Example B3 in which the diol B5 derived from 3-glycidoxypropyltrimethoxysilane was used to prepare a urethane compound having various side chains, and good results were obtained.

Example B10 is a modification of Example B8 in which units derived from 3-isocyanatopropyltriethoxysilane were introduced at the hydroxyl groups of the urethane compound to prepare a urethane compound having various side chains, and good results were obtained.

Example B11 is a modification of Example B1 in which the composition of the solvent was changed, and good results were obtained.

Example B12 is a modification of Example B8 in which the divalent isocyanate was changed when preparing the urethane compound, and the compositions of the ink dispersant and the solvent were changed, and good results were obtained.

Example B13 is an ink in which a urethane compound having benzyl groups and nitrogen-containing groups was prepared without introducing alkoxysilyl groups, and this urethane compound was then used in preparing the encapsulated pigment, and good results were obtained.

Comparative Example B1 is an ink in which a urethane compound having a methoxy polyethylene glycol chain was used in preparing the encapsulated pigment, and because the urethane compound exhibited miscibility with the non-aqueous solvent, the results for the image show-through and image density of the printed item were unsatisfactory.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising an encapsulated pigment containing a pigment and a urethane compound that coats a surface of the pigment, and a non-aqueous solvent, wherein
   the urethane compound has a urethane skeleton and one or more side chains, and is insoluble in the non-aqueous solvent, and
   the side chains of the urethane compound contain one or more moieties selected from the group consisting of an aromatic ring, a heterocyclic ring, a carboxyl group, an amide linkage, a fluoroalkyl group having one or more fluorine atoms, and a nitrile group.

2. The oil-based inkjet ink according to claim 1, wherein the side chains of the urethane compound contain an aromatic ring and one or more moieties selected from the group consisting of a heterocyclic ring, a carboxyl group, an amide linkage, a fluoroalkyl group having one or more fluorine atoms, and a nitrile group.

3. The oil-based inkjet ink according to claim 1, wherein
   the urethane compound has a structure in which a unit derived from a polyvalent isocyanate and a unit derived from an alkanolamine are arranged alternately, and
   the side chains of the urethane compound are bonded to the urethane compound via a nitrogen atom of the unit derived from the alkanolamine.

4. The oil-based inkjet ink according to claim 3, wherein the urethane compound also includes a unit derived from an asymmetric glycol.

5. The oil-based inkjet ink according to claim 3, wherein the unit derived from an alkanolamine comprises one or more units selected from the group consisting of
   units derived from a dialkanolamine to which an acrylate having an aromatic ring has been added by a Michael addition,
   units derived from a dialkanolamine to which an acrylamide having a heterocyclic ring has been added by a Michael addition, units derived from a dialkanolamine to which an N-acrylamide has been added by a Michael addition, and
units derived from a dialkanolamine to which an N,N-diacrylamide has been added by a Michael addition.

6. The oil-based inkjet ink according to claim 1, wherein the urethane compound has a repeating unit represented by formula (1) shown below:

[Chemical formula 1]

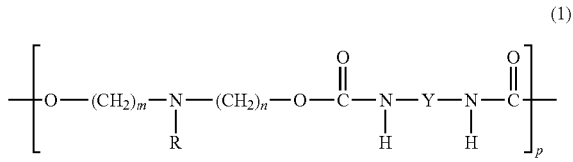

(1)

wherein
each of m, n and p independently represents a positive integer,
Y represents an arbitrary divalent group, and
R represents -A-R$^1$, wherein A represents a single bond or an arbitrary divalent group, and R$^1$ is selected from among an aromatic ring-containing group, a heterocyclic ring-containing group, a hydrogen atom, a carboxyl group, an amide linkage-containing group, a fluoroalkyl group having one or more fluorine atoms and a nitrile group, and may have a substituent.

7. The oil-based inkjet ink according to claim 1, wherein the side chains of the urethane compound contain one or more moieties selected from the group consisting of an aromatic ring, a heterocyclic ring, a carboxyl group, an amide linkage, a fluoroalkyl group having one or more fluorine atoms, and a nitrile group, and also contain an alkoxysilyl group.

8. The oil-based inkjet ink according to claim 7, wherein the urethane compound comprises a plurality of alkoxysilyl groups, and at least a portion of the plurality of alkoxysilyl groups forms one or more siloxane linkages.

9. The oil-based inkjet ink according to claim 7, wherein
the urethane compound has a structure in which a unit derived from a polyvalent isocyanate and a unit derived from a polyhydric alcohol are arranged alternately,
the unit derived from a polyhydric alcohol includes a unit derived from an alkanolamine, and
the unit derived from an alkanolamine comprises a unit A derived from an alkanolamine to which a compound having one or more moieties selected from the group consisting of an aromatic ring, a heterocyclic ring, a carboxyl group, an amide linkage, a fluoroalkyl group having one or more fluorine atoms, and a nitrile group has been added by a Michael addition, and a unit B derived from an alkanolamine having an alkoxysilyl group.

10. The oil-based inkjet ink according to claim 9, wherein the unit B derived from an alkanolamine having an alkoxysilyl group includes at least one type of unit selected from the group consisting of units derived from an alkanolamine to which a compound having an alkoxysilyl group and an unsaturated double bond has been added by a Michael addition, and units derived from an alkanolamine into which an alkoxysilyl group has been introduced by reaction with a compound having an alkoxysilyl group and an epoxy group-containing group.

11. The oil-based inkjet ink according to claim 7, wherein
the urethane compound has a structure in which a unit derived from a polyvalent isocyanate and a unit derived from a polyhydric alcohol are arranged alternately,
the unit derived from a polyhydric alcohol includes a unit derived from an alkanolamine,
the unit derived from an alkanolamine comprises a unit A derived from an alkanolamine to which a compound having one or more moieties selected from the group consisting of an aromatic ring, a heterocyclic ring, a carboxyl group, an amide linkage, a fluoroalkyl group having one or more fluorine atoms, and a nitrile group has been added by a Michael addition, and
the alkoxysilyl group is introduced via a mercapto group at an isocyanate group of the urethane compound.

12. The oil-based inkjet ink according to claim 7, wherein
the urethane compound has a structure in which a unit derived from a polyvalent isocyanate and a unit derived from a polyhydric alcohol are arranged alternately,
the unit derived from a polyhydric alcohol includes a unit derived from an alkanolamine,
the unit derived from an alkanolamine comprises a unit A derived from an alkanolamine to which a compound having one or more moieties selected from the group consisting of an aromatic ring, a heterocyclic ring, a carboxyl group, an amide linkage, a fluoroalkyl group having one or more fluorine atoms, and a nitrile group has been added by a Michael addition, and
the alkoxysilyl group is introduced via an isocyanate group at a hydroxyl group of the urethane compound.

* * * * *